US011880726B1

(12) United States Patent
Ahmadizadeh et al.

(10) Patent No.: US 11,880,726 B1
(45) Date of Patent: Jan. 23, 2024

(54) FAIR QUEUING OF REQUEST TASKS SPAWNED BY REQUESTS TO EXECUTE GENERATIVE OPERATIONS

(71) Applicant: Amazon Technologies, Inc., Seattle, WA (US)

(72) Inventors: Mehdi Ahmadizadeh, Sammamish, WA (US); Richard Threlkeld, Seattle, WA (US); Nicholas Andrew Dejaco, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/850,962

(22) Filed: Jun. 27, 2022

(51) Int. Cl.
*G06F 9/44* (2018.01)
*G06F 9/54* (2006.01)
*G06F 16/28* (2019.01)
*G06F 16/2455* (2019.01)

(52) U.S. Cl.
CPC .......... *G06F 9/546* (2013.01); *G06F 16/2455* (2019.01); *G06F 16/284* (2019.01)

(58) Field of Classification Search
CPC ....................................... G06F 9/546
USPC ......................................... 719/314
See application file for complete search history.

(56) References Cited

U.S. PATENT DOCUMENTS 10,089,142 B2 * 10/2018 Plattner ................. G06F 9/4881
10,656,966 B1 * 5/2020 Grubin .................. G06F 9/5033
2005/0022188 A1 1/2005 Tameshige et al.
2005/0192937 A1 9/2005 Barsness et al.
2009/0282272 A1 11/2009 Bestgen et al.
2015/0039586 A1 2/2015 Kerschbaum et al.
2019/0361916 A1 * 11/2019 Weaver ............... G06F 16/2365
2020/0192706 A1 6/2020 Huus et al.
2020/0412760 A1 12/2020 Luo et al.

(Continued)

OTHER PUBLICATIONS

Aguilera et al., "Matching Events in a Content-based Subscription System", PODC '99: Proceedings of the Eighteenth Annual ACM Symposium on Principles of Distributed Computing, May 1999, pp. 53-61.

(Continued)

*Primary Examiner* — Timothy A Mudrick
(74) *Attorney, Agent, or Firm* — NICHOLSON DE VOS WEBSTER & ELLIOTT LLP

(57) ABSTRACT

Fair queuing of request tasks spawned by requests to execute generative operations such as, for example, graph query language requests to execute a graph query language query, mutation, or subscription operations. Queuing techniques are used to prevent a heavy generative operation from dominating usage of computing resources of a host that executes many generative operations concurrently including a mix of heavy and normal generative operations. Generative operations are analyzed and classified as heavy or normal as the request tasks they spawn are being executed. If a generative operation is classified as heavy, then subsequent request tasks spawned by the heavy generative operation are added to an overload queue while request tasks spawned by concurrently executing normal generative operations as added to a main queue. For fairness, request tasks are polled from the main queue for execution at greater frequency than request tasks in the overload queue.

20 Claims, 13 Drawing Sheets

(56) References Cited

U.S. PATENT DOCUMENTS

2021/0306217 A1     9/2021   Paiva et al.

OTHER PUBLICATIONS

Bagchi, Saurabh, "Content-based Publish-Subscribe Middleware", Gryphon, Purdue Engineering, Jan. 26, 2003, 3 pages.

Fette et al., "The WebSocket Protocol", Internet Engineering Task Force (IETF), Request for Comments: 6455, Dec. 2011, 71 pages.

Github, "RFC: AppSync Enhanced Subscriptions Filtering #186", Available Online at <https://github.com/aws/aws-appsync-community/issues/186>, Nov. 8, 2021, pp. 1-26.

graphql.org, "GraphQL", Oct. 2021 Edition, Available Online at <https://spec.graphql.org/October2021/>, Oct. 2021, 174 pages.

Jacobsen, Hans-Arno, "Publish/Subscribe", Bell University Laboratory Chair in Software Engineering, Middleware Systems Research Group, University of Toronto, Available Online at <https://www.eecg.utoronto.ca/~jacobsen/courses/ece1770/slides/ps.pdf>, Mar. 2, 2007, 46 pages.

Kale et al., "Analysis and Algorithms for Content-based Event Matching", 25th IEEE International Conference on Distributed Computing Systems Workshops, Jun. 2005, 7 pages.

Doyle, Joseph, "Load Balancing and Rate Limiting based Algorithms for Improving Cloud Computing Performance", University of Dublin, Trinity College School of Computer Science and Statistics, Sep. 2012, 149 pages.

Non-Final Office Action, U.S. Appl. No. 17/703,743, dated May 4, 2023, 28 pages.

Stack Overflow, "How to Construct an Abstract Syntax Tree", Available Online at <https://stackoverflow.com/questions/1721553/how-to-construct-an-abstract-syntax-tree>, Retrieved on Apr. 29, 2023, 2018, 5 pages.

\* cited by examiner

FAIR QUEUING OF REQUEST TASKS SPAWNED BY REQUESTS TO EXECUTE GENERATIVE OPERATIONS

BACKGROUND

A cloud provider network or just "provider network" can provide users or "customers" of the network with the ability to access various provider network services, perform various provider network operations, or use various provider network resources. Users can use user accounts or customer accounts to access the services, perform the operations, or use the resources. Examples of services of the provider network that might be accessible by users include a virtualized computing service (e.g., AMAZON EC2), a relational database service (e.g., AMAZON RDS), a data storage service (e.g., AMAZON S3), a content delivery service (e.g., AMAZON CLOUDFRONT), a virtual private network service (e.g., AMAZON VPC), an event-driven notification and messaging service (e.g., AMAZON SNS), a web application deployment and scaling service (e.g., AMAZON BEANSTALK), a serverless compute service (e.g., AMAZON LAMBDA), etc. Examples of provider network operations that users might perform include executing a virtual machine (VM) instance or container, executing a batch job, executing code without provisioning a server, configuring a virtual network, etc. Examples of provider network resources that users might use include a content delivery network (CDN), a domain name service (DNS), a database, an application build or deployment service, an access policy or role, an identity policy or role, a VM or container image, a router, etc.

To access the service, invoke a provider network operation, or to use a provider network resource, the user can interact with the provider network across an intermediate network (e.g., the Internet) via an interface, such as through use of an application programming interface (API) call. The API call can be made via a console implemented as a website or an application, etc. An API refers to an interface or communication protocol between a client computing device (e.g., a client computing device of a user) and a server computing device in the provider network, such that if the client computing device makes a request in a predefined format, the client computing device should receive a response in a specific format or initiate a defined action. In the provider network context, an API provides a gateway for the client computing device to access provider network services, perform provider network operations, or use provider network resources by allowing the client computing device to obtain data from or cause actions within the provider network or by enabling the development of applications that interact with services, perform operations, and use resources in the provider network. An API can also allow a service of the provider network to exchange data with another service of the provider network.

One type of request that a client may make of some APIs is a request to execute an operation (e.g., an API request). The provider network can process many API requests concurrently to increase the request throughput while still maintaining an acceptable request latency. Here, request throughput refers to a number of API requests processed by the provider network within a time period and request latency refers to a time delay between when the provider network begins processing the API request and when the provider network completes processing of the API request.

By the way a provider network abstracts away from users the complexity of scaling service operation to highly concurrent operation, the provider network can give users the illusion of apparently infinite computing capacity. Of course, the computing capacity of the provider network to process API requests is finite. Consequently, an API request from a user that is relatively demanding on the computing resources of the provider network can unfairly affect other less demanding API requests from other users. This unfairness can manifest to the other users. For example, the other users may notice unacceptable request latency of their API requests caused by those requests competing for the finite computing resources of the provider network with a request that is dominating usage of the computing resources.

BRIEF DESCRIPTION OF DRAWINGS

Various embodiments in accordance with the present disclosure will be described with reference to the drawings, in which.

DETAILED DESCRIPTION

Figure 1:
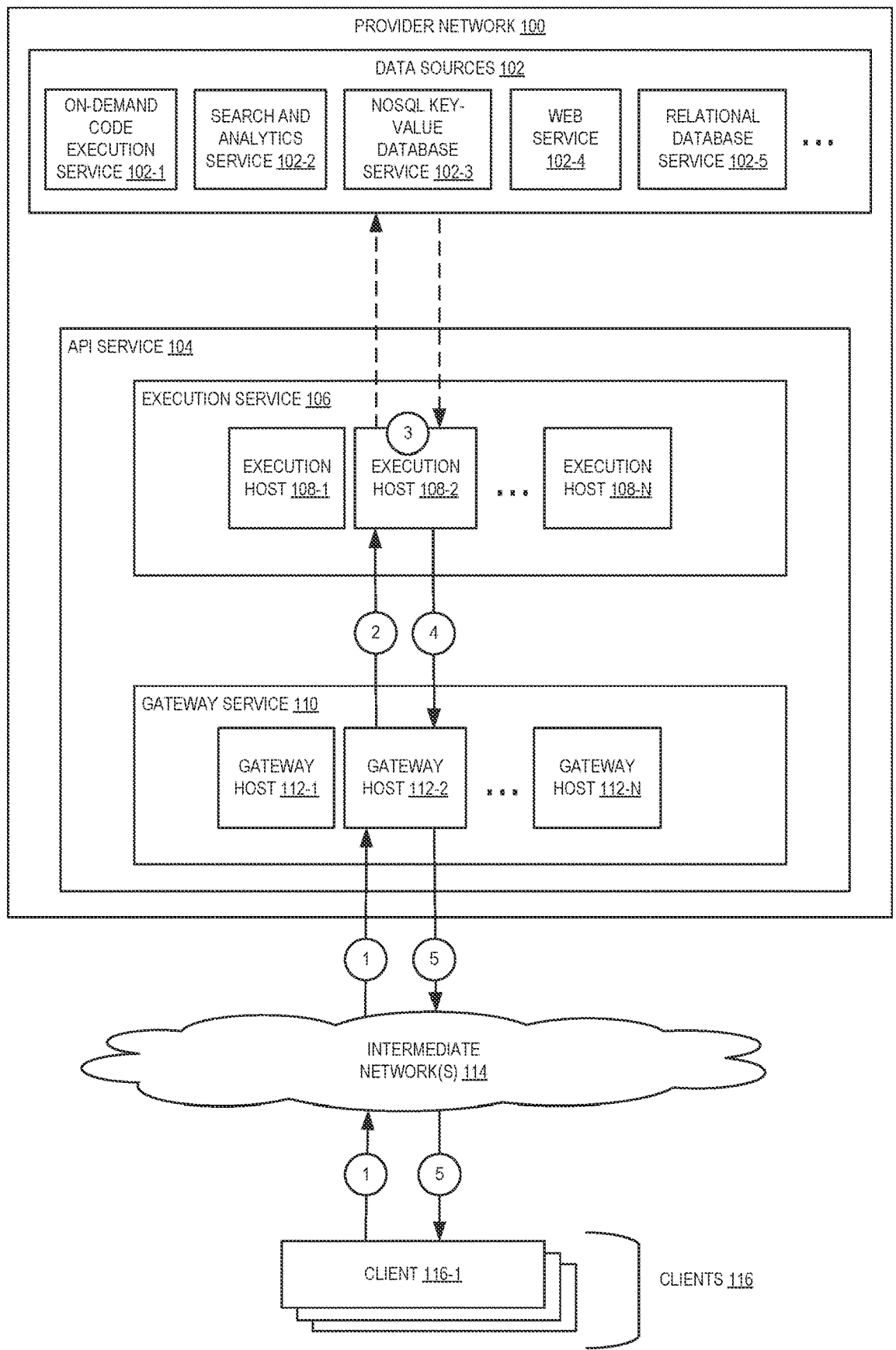
FIG. 1 illustrates an example provider network environment in which techniques for fair queuing of request tasks spawned by request to execution generative operations can be implemented, according to some examples.

Techniques for fair queuing of request tasks spawned by requests to execute generative operations are disclosed. In one aspect, the techniques encompass a method performed by a set of one or more computing devices. The method includes the steps of receiving a request to execute a generative operation; executing the generative operation over a time period to yield an operation result; and sending the operation result. During the time period, each request task of a first set of request tasks spawned by executing the generative operation is dequeued from a first queue and executed. A request cost index reflecting an amount of computing resources used to execute the first set of request tasks is determined. Based on the request cost index, a determination is made whether to queue, in a second queue, subsequent request tasks spawned by executing the generative operation. Based on a determination to queue the subsequent request tasks in the second queue, a second set of request tasks spawned by executing the generative operation is then queued in the second queue. Each request task of the second set of request tasks is dequeued from the second queue and executed. To provide fair concurrent execution of a mixed generative operation load (e.g., a mix of normal and heavy generative operations), request tasks can be dequeued and executed from the first queue at a greater rate than from the second queue (e.g., ten request tasks are dequeued and executed from the first queue for every one request task dequeued and executed from the second queue).

As well as a method, the techniques can also be implemented as a system. The system includes a set of one or more computing devices and has instructions which when executed cause performance of the method. The techniques can additionally be implemented as a non-transitory storage medium storing instruction which, when executed by a set of one or more computing devices, cause performance of the method.

An API service can receive and process API requests on behalf of users of the API service. Meeting user expectations for API request latency can be vitally important to the success of the API service. API request latency refers generally to the delay between when the API request is received at the API service and when the API service returns the result of executing the requested operation. Generally speaking, the lower the API request latency, the more satisfied users will be with the API service and the higher the API request latency, the less satisfied users will be with the API service.

API requests to execute generative operations can vary widely in the amount of computing resources (e.g., processor and memory resources) of the API service used. As used herein, a "generative operation" encompasses an operation composed of a set of one or more "parent" request tasks to be executed and where execution of a parent request task can spawn a set of one or more "child" request tasks to be executed and where a child request task can in turn spawn a set of one or more "grandchild" request tasks to be executed, and so on, to potentially form a multi-root tree of request tasks where the roots of the tree correspond to the parent request tasks, the leaves of the tree correspond to executed request tasks that did not spawn additional request tasks, and levels of the tree in between the roots and leaves correspond to request tasks that spawn additional request tasks. All request tasks in the tree that are executed for a generative operation including the parent request tasks, the leaf request tasks, and the request tasks in the tree in between the root and leaf request tasks can be said to be "spawned" by the generative operation.

Because of its generative nature, it can be difficult or impractical to predict, before a generative operation is executed, the amount of computing resources the generative operation will use when executed. Various factors can affect the amount of computing resources used including the number of fields that need to be resolved to data (field cardinality), the number of executions of functions to resolve the fields to the data (the number of resolver function executions), and the computational complexity of the resolver functions executed (resolver function complexity). Execution of a resolver function to resolve a field to data is an example of a request task that can be spawned by a generative operation. Resolver functions are described in greater detail elsewhere in this description.

The field cardinality, the number of resolver function executions, and resolver function complexity may be unknown or impractical to determine prior to executing the generative operation. Instead, these factors may only be practically determined after execution of the generative operation is initiated by monitoring the execution of the generative operation. As a result, a solution that attempts to schedule or queue the entire generative operation for concurrent execution by the API service with other generative operations before execution of the generative operation is initiated may be inadequate or at best informed only by partial information. Thus, a dynamic approach is needed that can carry out scheduling or queuing actions after execution of the generative operation is initiated and while the generative operation is still being executed. The present disclosure provides a solution to this and other needs.

To illustrate an example of the problem addressed herein, consider two API requests R1 and R2. Request R1 is to execute normal generative Operation O1 and Request R2 is to execute heavy generative Operation O2. Execution of normal generative Operation O1 could require only a few resolver function executions. Execution of heavy generative Operation O2 could require hundreds or even thousands of resolver function executions. Alternatively, normal generative Operation O1 and heavy generative Operation O2 could have the same or approximately the same number of resolver function executions. The computational complexity of the resolver functions executed for generative Operation O2 could be much greater than the computational complexity of the resolver functions executed for generative Operation O1.

In both cases, the amount of computing resources of the API service used by generative Operation O2 can be much greater than the computing resources used by generative Operation O1. As a result, concurrent execution of generative Operations O1 and O2 by the API service, or more generally concurrent execution of a mix of normal and heavy generative operations by the API service, may cause the request latency of normal generative operation O1 to spike well beyond a typical or expected request latency of a normal generative operation. If Requests R1 and R2 are submitted by different unaffiliated users, the impact that generative Operation O2 of Request R2 has on the request latency of Request R1 may be viewed as unfair.

One possible solution to fairly scheduling a mix of normal and heavy generative operations for concurrent execution by a set of processors is to use an executor pool. An executor pool can maintain a set of executors waiting for request tasks to be assigned for concurrent execution by the set of processors. The executors in the pool can be reused (recycled) over multiple request tasks, generative operations, and requests to avoid the computational overhead of creating and de-allocating an executor per-request task, per-generative operation, or per-request.

An example of executor can be a process, a thread, or other set of computer-executable instructions that can be scheduled to execute on a processor of a set of one or more processors by an underlying scheduler (e.g., an operating system or hardware scheduler). A processor of the set of processors can be a physical central processing unit (CPU), a physical CPU core, a logical CPU (e.g., a hardware thread), or a virtual CPU (vCPU) assigned to a virtual machine (VM). An executor that is assigned a request task is referred to herein as an "active" executor, even if that executor is currently not being executed by a processor (e.g., because of a context switch). An executor that is waiting for a request task to be assigned to it is referred to herein as "idle" executor.

Typically, the number of executors in the executor pool is more than the number of processors. In this case, each processor can context switch between executing different executors in the executor pool in a multitasking manner Context switching carries overhead associated with storing the current state of the executor currently being executed by a processor so that execution of that executor is paused while execution of another executor in the pool is resumed. Some context switching may be acceptable to increase the request task throughput.

Using an executor pool by itself may not be sufficient to fairly schedule a mix of normal and heavy generative operations for concurrent execution by the set of processors. In particular, there may be no idle executors available at a time when a request task of a normal generative operation is ready to execute. In this case, execution of the request task may need to wait until a currently active executor becomes idle. If all or nearly all active executors are then executing request tasks of a heavy generative operation, then this waiting or the extent of the waiting may be viewed as unfair to the normal generative operation. It may be possible to size the executor pool such that an idle executor is available when there is a request task ready to be executed. However, context switching overhead is in general proportional to the number of active executors in the pool. Thus, increasing the size of the executor pool too much can have detrimental impact on request task throughput and request task latency.

To address these and other issues, the disclosed techniques improve fairness in scheduling execution of request tasks spawned by generative operations that are concurrently executed by the API service. The techniques, in some examples, make use of two queues referred to herein as a "main" queue and an "overload" queue. If there are no idle executors available in the executor pool when a request task of a generative operation is ready to be executed by the API service, then the request task can be added to the main queue. The initial request tasks added to the main queue for the generative operation can be dequeued and executed as idle executors become available in the executor pool.

The execution of the initial request tasks can be monitored and a metric (termed a "request cost index" herein) can be determined based on the monitoring. The request cost index reflects the amount of computing resources of the API service utilized by the API service executing the initial request tasks. In some examples, the request cost index for the initial request tasks is determined as an amount of memory of the API service allocated as a result of executing the initial request tasks multiplied by the processor time spent by the API service executing the initial request tasks. For example, the request cost index can be determined in terms of bytes of memory allocated by the API service for the initial request tasks multiplied by the processor time in milliseconds spent by the API service executing the initial request tasks. However, the request cost index can encompass any metric or set of metrics that reflect an amount of computing resources of the API service used, consumed, or utilized to execute one or more request tasks.

After the request cost index for the initial request tasks is determined, the still executing generative operation can then be classified as normal or heavy based on the determined request cost index (e.g., classified as heavy because the request cost index exceeds a threshold). If the generative operation is classified as heavy, then subsequent request tasks spawned by the generative operation can be added to the overload queue instead of the main queue. To provide fairness in concurrently executing a mix of normal and heavy generative operations and so that heavy generative operations do not block or unfairly impact the request latency of normal generative operations, request tasks from the main queue can be dequeued and executed at a faster rate than request tasks in the overload queue.

In some examples, the generative operation can be classified as heavy based on the number initial request tasks added to the main queue (e.g., because the number of initial request tasks exceeds a threshold). In this case, subsequent request tasks for the generative operation can be added to the overload queue independent of the request cost index determined for the initial request tasks. This can be useful to protect normal generative operations from being unfairly impacted by heavy generative operations that spawn many computationally simple request tasks.

Examples of the techniques will now be described with respect to the figures. Many of the examples involve the GraphQL API standard, a current specification of which can be found on the internet at /October2021 in the spec.graphql.org internet domain. However, the techniques are not limited to GraphQL and the techniques can be applied to API requests to execute generative operations that conform to other API query languages including, but not limited to, the REpresentational State Transfer (REST) API query language or other API query language that conforms to an interface or communication protocol between a client computing device (e.g., a client computing device of a user) and a server computing device, such that if the client computing device makes a request to execute an operation in a format that accords with the interface or communication protocol, the client computing device should receive a response in a specific format or cause execution of the operation to be initiated.

FIG. 1 illustrates a provider network environment in which the techniques can be implemented. FIG. 1 also illustrates steps of a method for fair queuing of request tasks spawned by requests to execute a generative operation. The steps of the method are depicted by numbered circles. Data flow is depicted by directed arrows. The direction of an arrow in these and the other figures represents a direction of data flow between connected components but not necessarily the exclusive direction. In FIG. 1 and the other figures, dashed bracketed text and lines using large dashes, small dashes, dot-dash, or dots are used to illustrate optional aspects. However, such notation should not be taken to mean that these are the only options or the only optional aspects, or that blocks with solid borders are not optional. In FIG. 1 and the other figures, reference numerals with suffix letters (e.g., 1010-1 . . . 1010-N) are used to indicate merely that there can be one or multiple instances of the referenced element, feature, act, or operation, and when there are multiple instances, each does not need to be identical but can instead share some general traits or act in common ways. The particular suffixes used are not meant to imply that a particular amount of the element, feature, act, or operation exists unless specifically indicated to the contrary. Thus, two elements, features, acts, or operations using the same or different suffix letters might or might not have the same number of instances.

At a high-level, the method proceeds with Step 1 in which a request to execute a generative operation is sent by client 116-1 via set of one or more intermediate networks 114 to gateway host 112-2 of gateway service 110 of API service 104 in provider network 100. At Step 2, gateway host 112-2 sends the request to execution host 108-2 of execution service 106 of API service 104. At Step 3, execution host 108-2 executes the generative operation of the request to yield an operation result. At Step 4, the operation result is sent to gateway host 112-2 by execution 108-2. At Step 5, gateway host 112-2 sends the operation result to client 116 via set of intermediate networks 114. The method can be repeated for many clients 116. For example, the method can be performed concurrently for many requests from many clients 116.

For scalability, execution service 106 can be made up of multiple execution hosts 108-1, 108-2, . . . 108-N arranged in a distributed or concurrent computing arrangement. Likewise, gateway service 110 can be composed up multiple gateway hosts 112-1, 112-2, . . . 112-N. Execution host 108-2 is referred to in examples herein and is representative of any one of execution hosts 108-1, 108-2, . . . 108-N. Likewise, gateway host 108-2 is referred to in examples here and is representative of any one of gateway hosts 112-1, 112-2, . . . 112-N. The term "host" as used herein encompass any of a virtual or physical computing device, server, or machine. One example of a host is the computer system described below with respect to FIG. 13.

Execution host 108-2 can execute many generative operations concurrently including a mix of normal and heavy generative operation. As used herein, a "heavy" generative operation is a generative operation that uses or that is determined, predicted, or expected to use a greater than X percentile amount of computing resources of an execution host when executed by the execution host. A "normal" generative operation is a generative operation that is not a "heavy" generative operation. The value X can be determined or selected empirically or automatically. For example, X can correspond to the $90^{th}$, $95^{th}$, $99^{th}$, or $99.9^{th}$ percentile request cost index or request task cardinality of a set of reference generative operations. Here, "request task cardinality" refers to the number of request tasks spawned by a generative operation.

Execution of a generative operation by execution host 108-2 can spawn a set of request tasks that are executed by execution host 108-2. Execution of a request task by execution host 108-2 can consume computing resources of execution host 108-2. In some cases, a significant amount of computing resources can be consumed depending on the computational complexity of the request tasks or the request task cardinality. A heavy generative operation that spawns many request tasks or spawns computationally complex request tasks that consume many processor cycles, allocates a large amount of memory, or allocates many small blocks of memory can dominate usage of the computing resources of execution host 108-2 to the point that the request latencies of normal generative operations concurrently executed by execution host 108-2 spike dramatically.

To prevent the potential domination of the computing resources of execution host 108-2 by a heavy generative operation, execution host 108-2 can operate two queues that feed request tasks to an executor pool at execution host 108-2. The two queues are referred to herein as a "main queue" and an "overload" queue. Initially, request tasks spawned by the generative operation can be added to the main queue by execution host 108-2. Execution host 108-2 monitors the amount of computing resources of execution host 108-2 consumed by executing these request tasks added to the main queue. Based on the monitoring, execution host 108-2 can determine a request cost index that reflects the amount of computing resources of execution host 108-2 consumed by executing the request tasks added to the main queue. Based on the request cost index, execution host 108-2 classifies the generative operation as normal or heavy while the generative operation is still being executed by execution host 108-2. If execution host 108-2 classifies the generative operation as normal, then execution host 108-2 continues to add subsequent request tasks spawned by the generative operation to the main queue. If execution host 108-2 classifies the generative operation as heavy, then execution host 108-2 switches to adding subsequent request tasks spawned by the generative operation to the overload queue.

Execution host 108-2 can dequeue and execute request tasks from the main and overload queues at different rates. In particular, request tasks in the main queue can be dequeued and executed at a faster rate than request tasks in the overload queue. As one example, ten request tasks can be dequeued and executed from the main queue for every one request tasks dequeued and executed from the overload queue. By doing so, heavy generative operations can be prevented from dominating the computing resources of execution host 108-2 to the detriment of normal generative operations that are concurrently being executed by execution host 108-2 along with the heavy generative operations.

Returning to the top of FIG. 1, provider network 100 is programmed or configured to adhere to a "cloud" computing model that enables ubiquitous, convenient, on-demand network access to a shared pool of configurable resources such as networks, servers, storage applications, and services. The resources can be rapidly provisioned and released with minimal management effort or service provider interaction. A user of provider network 100 can unilaterally provision computing capabilities in provider network 100, such as server time and network storage, as needed automatically without requiring human interaction with each service provider.

Capabilities of provider network 100 can be available over a set of one or more intermediate networks 114 and accessed through standard mechanisms that promote use by heterogeneous thin or thick client platforms 116 such as mobile phones, tablets, laptops, and workstations. Computing resources such as storage, processing, memory, and network bandwidth in provider network 100 can be pooled to serve multiple users using a multi-tenant model, with different physical and virtual resources dynamically assigned and reassigned according to user demand There can be a sense of location independence in that the user generally can have no control or knowledge over the exact location of provided resources but can be able to specify location at a higher level of abstraction such as, for example, at the level of a country, state, or datacenter.

Provider network 100 can automatically control and optimize resource use by leverage a metering capability (e.g., on a pay-per-use or on a charge-per-use basis) at a level of abstraction appropriate to the type of service such as storage, processing, bandwidth, and active user accounts. Resource usage in provider network 100 can be monitored, controlled, and reported, providing transparency for both the provider and the user of a utilized service.

Provider network 100 can provide its capabilities to users according to a variety of different service models including Software-as-a-Service ("SaaS"), Platform-as-a-Service ("PaaS"), and Infrastructure-as-a-Service ("IaaS").

With SaaS, a capability is provided to a user using the provider's software applications running on the infrastructure of provider network 100. The applications can be accessible from various client devices through either a thin client interface such as a web browser, or a program interface. The infrastructure includes the hardware resources such as server, storage, and network components and software deployed on the hardware infrastructure that are necessary to support the services being provided.

Typically, under the SaaS model, the user does not manage or control the underlying infrastructure including network, servers, operating systems, storage, or individual application capabilities, except for limited user-specific application configuration settings. With PaaS, the user is provided the capability to deploy onto hardware and software infrastructure of provider network 100 user-created or acquired applications using programming languages, libraries, services, and tools supported by the provider or other sources.

Typically, under the PaaS model, the user does not manage or control the underlying hardware and software infrastructure including network, servers, operating systems, or storage, but has control over the deployed applications and possibly configuration settings for the application-hosting environment.

With IaaS, the user is provided the capability to provision processing, storage, networks, and other fundamental computing resources where the user can deploy and run arbitrary software, which can include operating systems and applications. The user does not manage or control the underlying hardware and software infrastructure but has control over operating systems, storage, and deployed applications and possibly limited control of selecting network components such as, for example, host firewalls.

Provider network 100 can provide its capabilities to a user according to a variety of different deployment models including as a private cloud, as a community cloud, as a public cloud, or as a hybrid cloud.

In a private cloud, the hardware and software infrastructure of provider network 100 is provisioned for exclusive use by a single organization which can comprise multiple users (e.g., business units). The private cloud can be owned, managed, and operated by the organization, a third party, or some combination of them, and it can exist on or off premises.

In a community cloud, the hardware and software infrastructure of provider network 100 is provisioned for exclusive use by a specific community of users from organizations that have shared concerns such as mission security requirements, policy, and compliance considerations. The community cloud can be owned, managed, and operated by one or more of the organizations in the community, a third party, or some combination of them, and it can exist on or off premises.

In a public cloud, the infrastructure is provisioned for open use by the public. The public cloud can be owned, managed, and operated by a business, academic, or government organization, or some combination of them. A public cloud exists on the premises of the public cloud provider.

In a hybrid cloud, the infrastructure is a composition of two or more distinct cloud infrastructures (private, community, or public) that remain unique entities, but are bound together by standardized or proprietary technology that enables data and application portability such as, for example, cloud bursting for load balancing between clouds.

To provide resource services to user, provider network 100 can rely upon virtualization techniques. For example, virtualization technologies can provide users the ability to control or use compute resources (e.g., a "compute instance," such as a virtual machine (VM) using a guest operating system (O/S) that operates using a hypervisor that might or might not further operate on top of an underlying host O/S, a container that might or might not operate in a VM, a compute instance that can execute on "bare metal" hardware without an underlying hypervisor), where one or multiple compute resources can be implemented using a single electronic device. Thus, a user can directly use a compute resource (e.g., provided by a hardware virtualization service) hosted by provider network 100 to perform a variety of computing tasks. Additionally, or alternatively, a user can indirectly use a compute resource by submitting code to be executed by provider network 100 (e.g., via on-demand code execution service 102-1), which in turn uses one or more compute resources to execute the code—typically without the user having any control of or knowledge of the underlying compute instances involved.

A user of provider network 100 can use a user account that is associated with a customer account, though these terms can be used somewhat interchangeably depending upon the context of use. A user can interact with provider network 100 across set of intermediate networks 114 (e.g., the internet, a cellular network, etc.) via an interface, such as through use of an application programming interface (API) call, via a console implemented as a website or application, etc.

An API refers to an interface or communication protocol between a client and a server, such that if the client makes a request in a predefined format, the client should receive a response in a specific format or initiate a defined action. In context of provider network 100, an API provides a gateway for a customer to access cloud infrastructure by allowing the customer to obtain data from or cause an action within provider network 100, enabling the development of an application that interacts with a resource or a service hosted in the provider network 100. An API can also enable a service of provider network 100 to exchange data with another service of provider network 100.

Data sources 102 are programmed or configured to provide services in provider network 100. Data sources 102 offer APIs to execution service 106 for accessing the services. Execution service 106 can access data sources 102 to fetch (retrieve) data from data sources 102 in response to requests or to mutate (change) data managed by data sources 102. The APIs offered by data sources 102 to API service 104 can also be offered to other services in provider network 100 and to users over set of intermediate networks 114.

Data sources 102 can include different types. However, no particular type of data source is required. In the example of FIG. 1, data sources 102 include on-demand code execution search 102-1, search and analytics service 102-2, NOSQL key-value database service 102-3, web service 102-4, and relational database service 102-5, among other possible types of services.

While data sources 102 are depicted in FIG. 1 within provider network 100, some or all of data sources 102 can be located external to provider network 100 such as, for example, located in one or more other provider networks that are accessible via set of intermediate networks 114. While multiple data sources 102 are depicted in the environment of FIG. 1, the environment can have as a few as one data source or more data sources than depicted.

On-demand execution service 102-1 is configured or programmed to provide an event-driven, serverless computing service and offer an API for accessing and using the service. Service 102-1 can run code in response to events. Service 102-1 can be programmed or configured to automatically manage the computing resources required by the executed code. Execution of the code can be triggered by an event such as an API call, a sensor output, or message passing from other code executed by service 102-1. "Serverless" computing refers to a cloud computing execution model in which provider network 100 allocates machine resources on demand taking care of the servers on behalf of users. While execution of code by service 102-1 is not strictly serverless, developers of the code need not be concerned with capacity planning, configuration, management, maintenance, fault tolerance, or scaling of execution containers of the code by service 102-1. Serverless computing might not hold resources in volatile memory when code is not being executed. Instead, computing by service 102-1 can be accomplished in short bursts and on-demand (in response to events) with results persisted to storage. When code is not being executed, computing resources of service 102-1 might not be allocated to the code.

Search and analytics service 102-2 is configured or programmed to provide search and analytics services and an API for accessing the service. Service 102-2 can support various use cases such as log analytics, real-time application monitoring, and clickstream analysis.

NOSQL key-value database service 102-3 is configured or programmed provide a NOSQL database service and offer an API for accessing the service. The NOSQL database service can support key-value and document data structures. A key-value pair (also known as a name-value pair, attribute-value pair, or field-value pair) is a fundamental data representation in computing systems and applications. A database managed by service 102-3 can conform to a data model expressed as a collection of 2-tuples in the form <key, value> with each element being a key-value pair.

Web service 102-4 is configured or programmed to respond to HTTP requests with HTTP responses.

Relational database service 102-5 is configured or programmed to provide a distributed relational database management service and offer an API for accessing the service (e.g., using the Structured Query Language (SQL)).

API service 104 is configured or programmed to provide an API query language interface for client-server applications. An application developer can use API service 104 to program or configure an application API for a client-server application such as, for example, a web or mobile application. API service 104 can be viewed as a managed service where an application developer programs or configures their application API with API service 104. API service 104 takes care of processing and responding to requests via the API query language interface in accordance with the specified application API. In this way, a separation of concerns is achieved where the application developer is freed to focus on the design of the application API with less concern about implementing and operating and providing the computing resources for the API query language interface that supports execution of the application API.

In some examples, API service 104 supports the GraphQL API query language. GraphQL is a query language designed to build client-server applications by providing an intuitive and flexible syntax and system for describing data requirements and interactions of the applications. A client computing device (e.g., client 116-1) can use the query language to make requests to API service 104. A request can contain an operation such as a query, mutation, or subscription. A request is defined as a syntactic grammar in which terminal symbols are tokens. The tokens are defined in a lexical grammar which matches patterns of permitted source characters (e.g., UNICODE code points U+0009, U+000A, U+000D, and U+0020 through U+FFFF). A request can be composed of a sequence of permitted source characters.

A request can request to execute a query, mutation, or subscription operation, any of which can be a generative operation. A query can be a read-only fetch operation. A mutation can be a write operation followed by a fetch operation. A subscription can be a long-lived request that fetches data in response to source events.

Regardless of generative operation type, each type of operation can be specified in a request by an optional operation name and a selection set. A selection set is a set of one or more selections where a selection can be a field. A field describes a discrete piece of information available to request within a selection set. A field can itself contain a selection set to form nested or deeply nested requests.

This ability to form nested requests to describe complex data or relationships to other data contributes to the wide variability in the amounts of computing resources utilized by executing different operations. The request cost index herein accurately measures the amount of computing resources utilized by different operations from simple operations with no nested selection sets and complex operations with nested selection sets. Ultimately, an operation can specify their selections down to fields which return scalar values to ensure an unambiguously shaped operation result of the operation.

The following is an example of a request specifying a query operation to fetch the name of the user with id "13". In this example, the keyword "query" is omitted from Line 00 and the request is interpreted by API service 104 as a query type operation by default (e.g., as opposed to a mutation or subscription operation). In this example, both "user" (Line 01) and "name" (Line 02) are fields and a selection set requesting the "name" field is nested within the "user" field of the top-level selection set. The request might be sent by client 116-1 and received by an application API of API service 104, as in Step 1 of FIG. 1, for example.

Line 00: {
01: user(id: 13) {
02: name
03: }
04: }

The query operation when executed by execution host 108-2 might yield the following operation result. The operation result can be sent by execution host 108-2 and received by gateway host 112-2 as in Step 4 of FIG. 1, for example, and then sent by API service 104 and received by client 116-1, as in Step 5 of FIG. 1, for example.

00: {
01: "user": {
02: "name": "Davis Ghosh"
03: }
04: }

The above example illustrates how the shape of a generative operation result can mirror the shape of the request to execute the generative operation such that the operation result provides exactly the information that is requested and nothing more, thereby avoiding over-fetching and under-fetching data.

The following is an example of a request containing a mutation operation that might be sent by device 116-1 and received by an application API at API service 104, as in Step 1 of FIG. 1, for example. In this example, the "likeCount" field is a field of a selection set nested within the "story" field which is a field of a selection set nested within the "likePost" field which is a field of the top-level selection set. In the example, the keyword "mutation" is used in Line 00 to distinguish the operation from a query operation and a subscription operation.

```
00: mutation {
01: likePost(postID: 12345) {
02: story {
03: likeCount
04: }
05: }
06: }
```

The above example mutation operation requests to "like" a post and then fetches the new number of likes.

The following is an example of a request containing a subscription operation that might be sent by device 116-1 and received by an application API at API service 104, as in Step 1 of FIG. 1, for example. In the example, the keyword "subscription" is used in Line 00 to distinguish the operation from a query operation and a mutation operation.

```
00: subscription NewMessages {
01: newMessage(roomId: 123) {
02: sender
03: text
04: }
05: }
```

The above-example subscription operation subscribes to new messages posted to chat room 123. While a client is subscribed, whenever new messages are posted to chat room with ID "123", the fields for "sender" and "text" will be resolved by API service 104, as in Step 3 of FIG. 1, for example, and published to client 116-1, as in Step 5 of FIG. 1, for example.

Execution service 106 is programmed or configured to execute operations in requests to execute the operations sent from clients (e.g., client 116-1). For example, execution service 106 can be programmed or configured to execute queries, mutations, and subscription operations. If the operation is a query or a mutation operation, then the operation result of executing the operation by execution service 106 can be the result of executing the operation's top-level selection set. If the operation is a subscription, then the operation result can be an event stream where each event in the event stream can be the result of executing by execution service 106 the subscription operation for each new event in an underlying source event stream. Execution of a subscription operation by execution service 106 can create a persistent function on API service 104 that maps the underlying source event stream to a returned response event stream.

Returning to the chat application example above, to subscribe to new messages posted to a chat room, client 116-1 might send the above request to execute the "NewMessages" subscription operation. While the client 116-1 is subscribed, whenever new messages are posted to chat room with ID "123", the fields for "sender" and "text" will be resolved by execution host 108-2, as in Step 3 of FIG. 1, for example, and published to client 116-1, as in Step 5 of FIG. 1, for example. For example, client 116-1 might receive the following operation result from API service 104 when a new message is posted to chat room "123":

```
00: {
01: "data": {
02: "newMessage": {
03: "sender": "Trott",
04: "text": "Did you finish that TPS report?"
05: }
06: }
07: }
```

Execution service 106 can be programmed or configured to represent a requested operation as an abstract syntax tree according to an API schema. The API query language (e.g., GraphQL) can be defined as a syntactic grammar where terminal symbols are tokens. Tokens can be defined in a lexical grammar which matches patterns of source characters. The result of parsing a sequence of source characters of a request by execution service 106 can produce a sequence of lexical tokens according to the lexical grammar. The abstract syntax tree can then be produced by execution service 106 according to the syntactical grammar In an embodiment, an application developer defines an API schema which determines their application API contract for a client application to communicate with by means of an API query language. For example, the API query language can be GraphQL over the HyperText Transport Protocol (HTTP) as the application network layer transport protocol. As used herein, the term "HTTP" is intended to include cryptographically secured variants commonly referred to as "HTTPS". API service 104 can support and provide an API query language interface for multiple different application APIs as defined by multiple different API schemas. Likewise, API service 104 can generate many abstract syntax tree representations of many different requested operations of many different requests of many different application APIs.

Upon receiving an operation of a request of an application API from gateway host 112-2 as in, for example, Step 2 of FIG. 1, execution host 108-2 can convert the operation to an abstract syntax tree representation according to an API schema that defines the application API. Leaf nodes of the abstract syntax tree can be associated with one or more resolver functions by the API schema. The attached resolver functions are responsible for resolving fields of the operation to data. A resolver function can resolve a field to data by fetching the data from a data source. A field can be resolved to a scalar data type or a collection of scalar data types such as, for example, a string, an integer, a list of strings, a list of integers, a set of strings, a set of integers, a dictionary containing a mix of strings and integers, etc. However, API service 104 can allow an application developer to define an API schema such that a field can be resolved by execution host 108-2 (e.g., as a request task) to one or more instances of a complex data type. The complex data type can be defined in an API schema in terms of fields that require further resolving by execution host 108-2 by executing one or more additional resolver functions (e.g., as one or more additional request tasks). As such, execution host 108-2 can add new nodes to the abstract syntax tree corresponding to new fields needing to be resolved by execution host 108-2 as the operation is executed by execution host 108-2 and as data returned from data sources 102 is processed by the resolver functions. Because this ability provided by API service 104 to dynamically resolve fields in data fetched from data sources 102, a seemingly simple operation can require many fields to be resolved (e.g., many request tasks to be executed) when the operation is executed by execution host 108-2.

Consider the following example API schema that defines at Line 04 a query operation "getTodos" that returns a list of "Todo" objects.

```
00: schema {
01: query:Query
02: }
03: type Query {
04: getTodos: [Todo]
05: }
```

```
06: type Todo {
07:   id: String
08:   name String
09:   description: String
10:   priority: Int
11:   comments: [Comment]
12: }
13: type Comment {
14:   todoid: String
15:   commentid: String
16:   content: String
17: }
```

According to the above API schema, resolving the "getTodos" field of the following query operation can involve N+1 resolver function executions where N is the number of "Todo" objects in the list of "Todo" objects to which the "getTodos" field is resolved by a resolver function associated with a node of an abstract syntax tree representation of the query, the node representing the "getTodos" field of the query operation.

```
00: query {
01:   getTodos {
02:     id
03:     name
04:     comments {
05:       commentid
06:       content
07:     }
08:   }
09: }
```

Execution of the above generative query operation by execution host 108-2 can involve N resolver function executions (e.g., N request tasks) in addition to the one resolver function execution/request task for the "getTodos" field, one resolver function execution/request task for each "Todo object" in the fetched list to resolve the "comments" field of each "Todo" object to a fetched list of "Comment" objects for the "Todo" object. For each of the N instances of the "comments" field that need to be resolved, execution host 108-2 can add descendent nodes of the node representing the "getTodos" field to the abstract syntax tree representation of the generative query operation. Each of those descendant nodes can be associated with a resolver function for resolving the "comments" field. The mapping between a field and the resolver function for resolving that field can be defined in the API schema.

The above example illustrates how a seemingly simple generative operation involving a small number of specified fields can require a much larger number of fields instances that need to be resolved. Thus, a metric that counts the number of fields referenced in a generative operation might not accurately reflect the amount of computing resources utilized to execute the operation. Counting the number of resolver function executions can be more accurate. However, resolver functions themselves can vary in their execution complexity and computing resources utilized. Thus, even this metric can be too inaccurate. The request cost index metric used herein accurately accounts for the computing resources utilized by executing an operation by measuring the amount of computing resources (e.g., memory and processor time) utilized by the resolver function execution/request tasks spawned/caused by the operation.

As mentioned, each application API available at API service 104 can be defined by a respective API schema. The API schema is used by API service 104 to determine if a requested operation is valid for the respective application API. The API schema can define the shape of the data that flows through the application API. The API query language supported by API service 104 can be strongly typed such that API service 104 validates requested operations of the application API against the API schema.

A request cost metric can be a measurement of the computing resource cost to execution host 108-2 to execute a requested generative operation. In some examples, the request cost index measures the amount of computing resources of execution host 108-2 used by executing the requested operation in terms of processor and memory usage. Processor usage can be measured by an amount of time spent by a processor of execution host 108-2 executing instructions that carry out the requested operation. Memory utilization can be measured by an amount of heap memory allocated at execution host 108-2 because of executing the requested operation.

The processor utilization and memory usage of executing a requested operation can vary depending on the resolver functions/request tasks execution during execution of the requested operation. A resolver function/request task can be executed to resolve a field instance to data. The API schema can attach a resolver function/request task to a field such that when an instance of the field needs to be resolved, execution host 108-2 executes the attached resolver function/request task. This resolving can involve fetching data from a data source. In addition, a resolver function/request task can be programmed or configured with transformation and execution logic that when executed performs various processor and memory utilizing operations including, but not limited to, building a data source request to fetch data from a data source, mapping data fetched from a data source to data structures more compatible with the API query language, and building a response to be returned by the resolver function execution. Such operations can involve processor and memory intensive operations such as serializing and deserializing data objects between a data serialization format used by a data source (e.g., JavaScript Object Notation) and the API query language format (e.g., GraphQL), among other possible transformation and execution logic operations of the resolver function.

In some examples, the request cost index determined for a requested operation reflects an amount of processor time spent and an amount of memory allocated by execution host 108-2 for all resolver function executions by execution host 108-2 for the requested operation. The request cost index can be determined as the sum of "per-node" or "node" request cost indexes. Each node request code index reflects an amount of processor time spent and an amount of memory allocated by execution host 108-2 for one respective resolver function/request task execution. The term "node" is used because the resolver function/request task execution corresponds to a node in the abstract syntax tree representation of the requested operation where the node represents the field instance that is resolved by the resolver function/request task execution. While the request cost index can be determined as a sum of node request cost indexes, the request cost index can be an average, mean, or other statistical formulation of the set of node request cost indexes determined for the requested operation.

In some examples, processor time refers to the amount of time a processor execution host 108-2 is used for processing instructions of a resolver function/request task. Where the processor executes multiple resolver functions/request tasks concurrently as may often e the case due to a multi-tenant nature of API service 104, the processor time to execute a resolver function/request task will typically be less than the elapsed time to execute the resolver function/request task as there typically will be portions of the elapsed time when instructions of the resolver function/request task are not being executed by the processor, for example, because the thread or process in which the instructions of the resolver function/request task execute is waiting on input/output (I/O) or incurring a multi-tasking delay because of a context switch.

In some instances, instructions of a resolver function/request task can be executed by multiple processors of execution host 108-2 in a parallel processing manner In this case, the node processor time of the resolver function/request task can be determined as the sum of the processor times for each of the multiple processors. In this case, the node processor time for a resolver function/request task executed in a parallel processing manner can be greater than the elapsed time to execute the resolver function/request task. While the node processor time can be determined as a sum, an average, or other statistical formulation of the set of per-processor processor times can be determined as the node processor time.

A resolver function/request task can execute on various different types of processors and a processor time to execute the resolver function/request task can reflect the time spent by various different types of processors executing the resolver function/request task. For example, a processor that executes a resolver function/request task can be a physical central processing unit (physical CPU), a core of a multi-core microprocessor, or a logical CPU of a multi-threaded microprocessor core. As such, a processor time for a resolver function/request task execution can reflect a CPU time, a CPU core time, or logical CPU time. If a resolver function executes in a virtualized computing environment, then the resolver function/request task can be executed by one or more virtual CPUs (or vCPUs). In this case, processor time can reflect a vCPU time spent executing instructions of the resolver function/request task.

In some examples, memory allocated by a resolver function refers to memory space allocated on the heap because of executing the resolver function/request task. The resolver function/request task can be programmed or configured in a high-level computer programming language that provides runtime memory management capabilities such as garbage collection or reference counting such that the programmer of the resolver function/request task is not explicitly responsible for ensuring that memory allocated on the heap is reclaimed before the resolver function/request task execution ends. For example, a resolver function/request task can be programmed or configured in PHYTHON, JAVA, or the high-level programming language that provides an implicit deallocation experience to the programmer. To do this, the language runtime provides a way to automatically reclaim memory allocated on the heap by the resolver function/request task without relying on expressly programmed or configured instructions to do so.

One way the language runtime can do this is by using a garbage collector. The garbage collector runs periodically to check for memory allocated on the heap that is no longer being used by a resolver function/request task execution and reclaims it for use by other resolver function/request task executions. However, the garbage collection process itself consumes computing resources of execution host 108-2 where generally, for a given resolver function/request task execution, the greater number of memory objects the resolver function/request task execution allocates on the heap, the greater the utilization of computing resources of execution host 108-2 by the garbage collection process to reclaim the allocated memory space.

In some examples, the request cost index determined for a requested operation incorporates the amount of heap memory allocated by the resolver functions/request tasks executed by execution host 108-2 to carry out the requested operation. By doing so, the request cost index indirectly reflects the computing resources utilized by runtime memory management operations such as garbage collection of the heap memory allocated. In addition, since memory space of execution host 108-2 is finite and can be shared by many resolver function/request task executions, by incorporating the amount of heap memory allocated into the request cost index, it reflects the share of finite memory space that the executing the requested operation consumed.

At Step 3 of FIG. 1, the requested generative operation is executed. Such execution can include applying an API schema to the requested operation, generating an abstract syntax tree representation of the requested operation, executing one or more resolver function/request tasks, and determining a request cost index for the requested operation. In some examples, determining the request cost index includes determining a node request cost index for each resolver function/request task execution of the requested operation. The request cost index can be determined as the sum of the per-node request cost indexes. Alternatively, the average, the mean, or other statistical formulation of the per-node request cost indexes can be determined. If executing the requested operation by execution host 108-2 involves just a single resolver function/request task execution, then the request code index can be the node request cost index determined for that resolver function/request task execution.

While the request cost index can be determined based on only one or more per-node request cost indexes for one or more resolver function/request task executions, the request cost index can be determined based on additional request cost indexes such as a request cost index reflecting an amount of computing resources of execution host 108-2 utilized to execute logic of the requested operation other than logic of a resolver function. However, the request cost index preferably reflects at least an amount of computing resources used to execute the resolver function(s) execution by the requested operation.

The resolver functions executed by a requested operation are typically programmed or configured by application developers to meet the requirements of a particular application API or a particular application. As such, the complexity of the resolver functions/request tasks can vary greatly between different applications, different application APIs, and possibly even different application developers, and in ways that are not under direct control of provider network 100 or API service 104. Thus, by accounting for the computing resources utilized by executing resolver functions/request tasks, the request cost index accounts for factors that contribute to the variability in computing resource utilization by executing the requested operation.

In some examples, the request cost index is a measurement in terms of bytes of memory allocated to execute the requested operation multiplied by the processor time spent executing the requested operation. For example, the request cost index can be a number of bytes, kilobytes, megabytes, or gigabytes of memory allocated for the requested operation multiplied by the number of nanoseconds, milliseconds, or seconds of processor time spent executing the requested operation. Likewise, a node request cost index can be determined as an amount of memory allocated to execute a respective resolver function/request task multiplied by the processor time spent executing the respective resolver function/request task.

A resolver function/request task can be executed by execution host 108-2 in the context of a thread of execution or a process (e.g., an operating system user process, thread, or the like). Determination of the amount of memory allocated by executing a resolver function/request task can be based on the amount of memory allocated by the thread or the process that executes the resolver function/request task. For example, the amount of memory allocated to execute the resolver function/request task can be determined based on the difference between (a) the amount of memory allocated by the thread or process that executes the resolver function/request task at a time before or at the start of resolver function/request task execution, and (b) the amount of memory allocated by the thread or process at a time after or at the end of resolver function/request task execution. This difference represents the amount of memory allocated by the thread or process while executing the resolver function/request task. Other techniques for determining the amount of memory allocated by executing a resolver function/request task can be used according to the requirements of the particular implementation at hand. No particular technique is required.

In some examples, the allocated memory measured includes memory allocated on the memory heap that may be eventually reclaimed by an automatic memory management process such as a garbage collection process. While the allocated memory measured can include just memory allocated on a memory heap, the allocated memory measure can include other types of allocated memory such as, for example, other types of dynamic allocated memory allocated in volatile or non-volatile memory.

Determination of the processor time spent by execution host 108-2 executing a requested operation can include measuring the processor time spent executing instructions programmed or configured to carry out transformation and execution logic of resolver functions/request tasks executed to resolve fields of the requested operation. Such logic can include building requests of data sources 102, serializing and deserializing data objects to and from a data serialization format, mapping response data received from data sources 102 to API query language data structures, and other programmed or configured logic of a resolver function including, for example, program control flow operations and the operations thereof such as if-then-(else) statements, for loops, while loops, count controlled loops, condition controlled loops, collection controlled loops, general iteration, etc.

Processor time can be measured in various different ways and no particular way is required. For example, processor time can be measured by the processor time consumed by a thread or process that executes a resolver function/request task. Such processor time might not include elapsed time that the thread or process is idle waiting on I/O such as I/O to or from data sources 102 or idle because of a context switch. Thus, the processor time to execute a resolver function can generally not be affected by the amount of elapsed time spent by a data source processing and responding to a request from the resolver function/request task.

Figure 2:
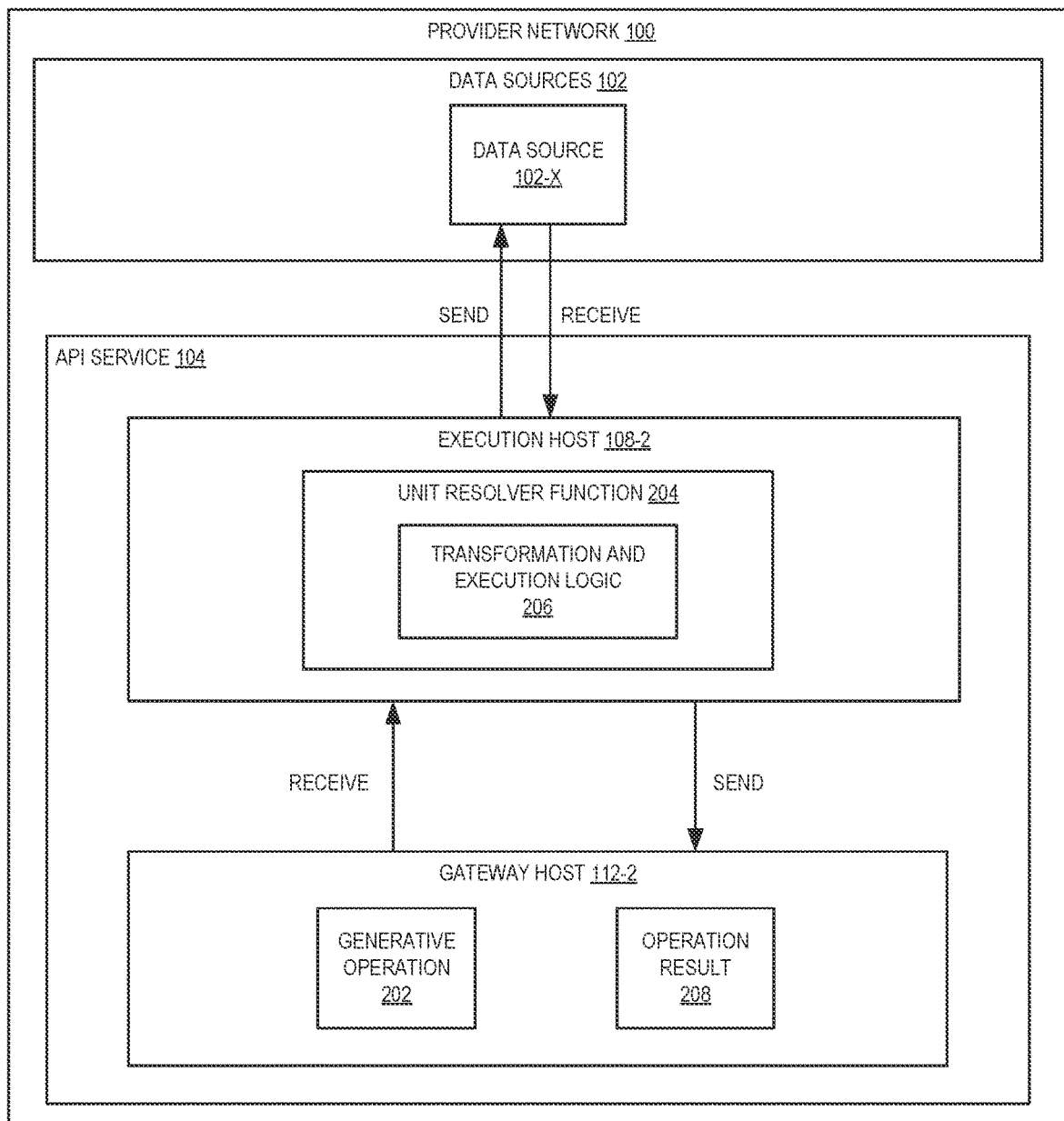
FIG. 2 illustrates a simplified view of the example environment of FIG. 1 that includes a unit resolver function, according to some examples.

Turning now to FIG. 2, it is a diagram illustrating a simplified view of the environment of FIG. 1 that highlights the operation of a unit resolver function according to some examples. A requested generative operation 202 is sent to execution host 108-2 for execution. Executing requested operation 202 can involve resolving a field to data by invoking unit resolver function 204. Unit resolver function 204 is a resolver function programmed or configured with transformation and execution logic 206. Among other operations, transformation and execution logic 206 can be programmed or configured to access one data source designated as data source 102-X. Execution host 108-2 can return to gateway host 112-2 operation result 208 of executing requested operation 302. Execution host 108-2 can generate operation result 208 based on unit resolver function 204 resolving the field to data. The request cost index for requested operation 202 can reflect an amount of computing resources utilized to execute transformation and execution logic 206 of unit resolver function 204. Executing requested operation 202 can involve executing unit resolver function 204 in addition to one or more other resolver functions (including other unit resolver functions) depending on the fields of requested operation 202 that need to be resolved by resolver functions.

Figure 3:
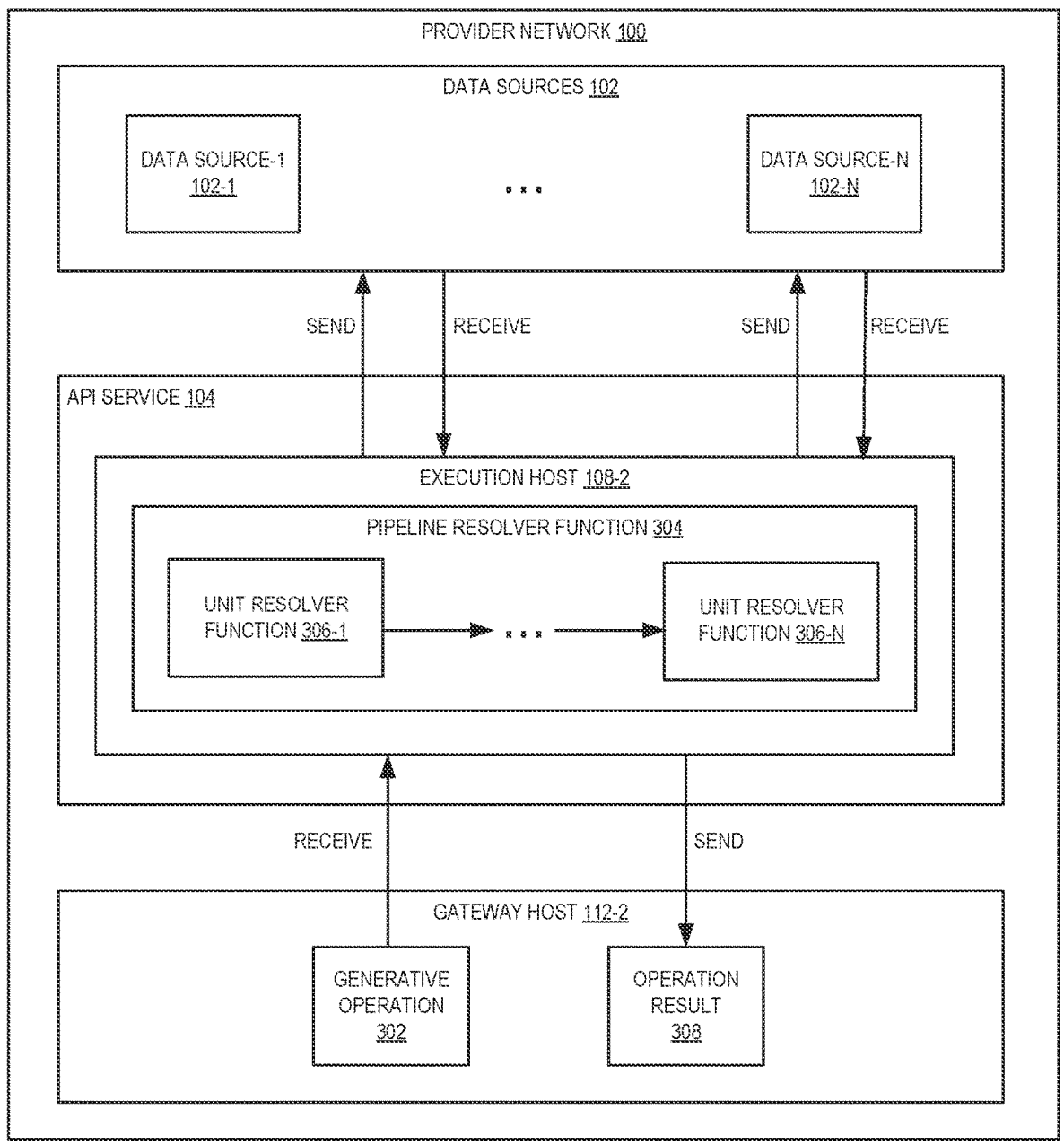
FIG. 3 illustrates a simplified view of the example environment of FIG. 1 that includes a pipeline resolver function, according to some examples.

Turning now to FIG. 3, it is a diagram illustrating a simplified view of the environment of FIG. 1 that highlights the operation of a pipeline resolver function according to an embodiment. A requested generative operation 302 is sent by gateway host 112-2 to execution host 108-2 for execution. Executing requested operation 302 by execution host 108-2 can involve execution host 108-2 resolving a field to data by invoking pipeline resolver function 304. Pipeline resolver function 304 is programmed or configured with a sequence of unit resolver functions 306-1 to 306-N that are executed in the sequence order to resolve the field to data. The output or result of an earlier executed unit resolver function in the sequence can be used by a later executed unit resolver function in the sequence (e.g., to form a request of a data source). Each unit resolver function in the sequence can be programmed or configured with transformation and execution logic to access a respective one of the data sources 102-1 to 102-N.

Execution host 108-2 can return to gateway host 112-2 operation result 308 of executing requested operation 302. Execution host 108-2 can generate operation result 308 based on pipeline resolver function 304 resolving the field to data. The request cost index determined for requested operation 302 can reflect an amount of computing resources utilized to execute transformation and execution logics of the unit resolver functions that make up pipeline resolver function 304, as well as other transformation and execution logic of pipeline resolver function 304 such as pre and post pipeline operations. Executing requested operation 302 can involve executing pipeline resolver function 304 in addition to one or more other resolver functions (including other pipeline resolver functions or other unit resolver functions) depending on the fields of requested operation 302 that need to be resolved by resolver functions.

While a resolver function can be programmed or configured to access one or more data sources to resolve a field to data, a "local" resolver function can be programmed or configured to resolve a field to data without accessing a data source. Thus, execution of a requested operation by execution host 108-2 can involve invoking an executing one or more local resolver functions, one or more unit resolver functions, or one or more pipeline resolver functions.

Figure 5:
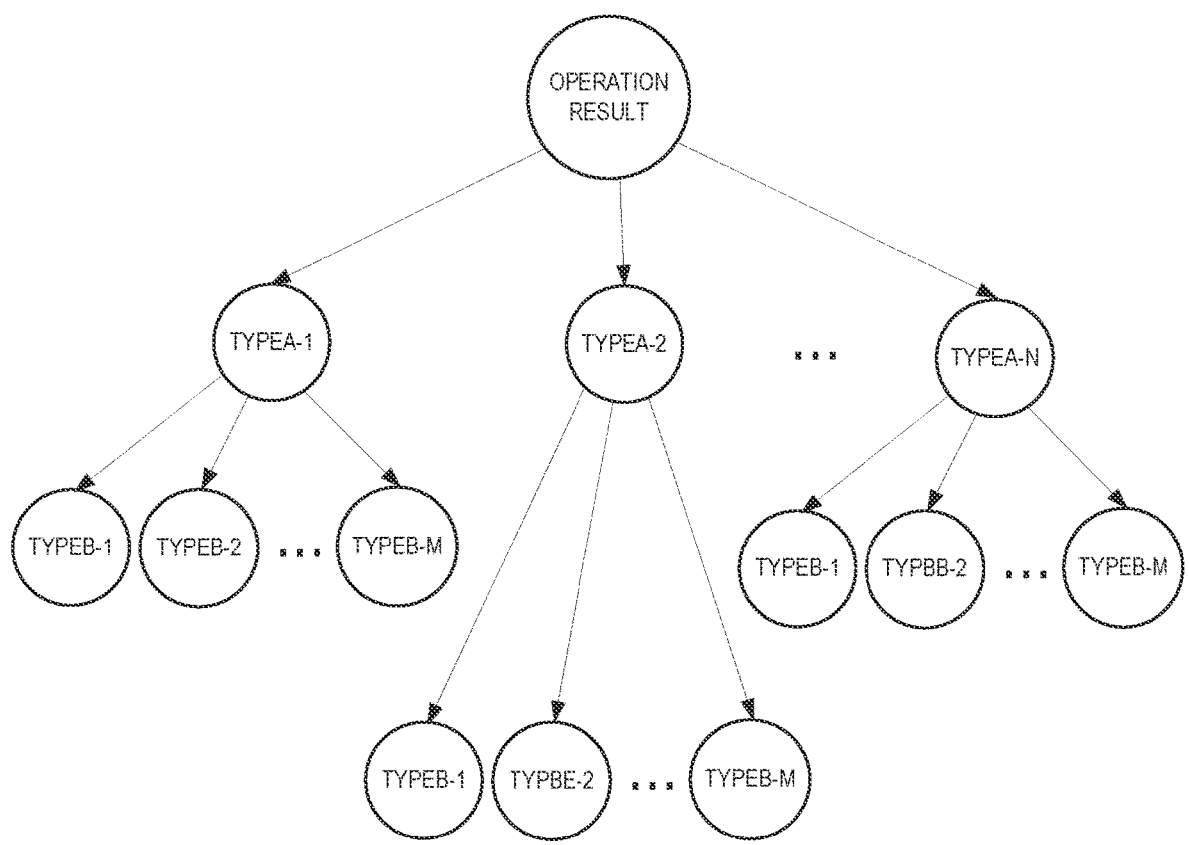
FIG. 5 illustrates a tree representation of an operation result to the example generative query operation of FIG. 4, according to some examples.

FIG. 5 is a diagram illustrating an example of generative query operation execution according to an embodiment. Query operation 402 requires resolving of field FIELD1 of the query operation 402. Resolver function-1 404-1 is executed by execution host 108-2 to resolve field FIELD1 of query operation 402 to a list of data objects of type TYPEA. To do this, resolver function-1 404-1 accesses data source-1

406-1. Each data object instance of type TYPEA in the fetched list has a String value for field FIELD2 of the instance that does not need further resolving by a resolver function, an integer value for field FIELD3 of the instance that also does not need further resolving by a resolver function, and a field FIELD4 which needs to be resolved. To do this, resolver function-2 404-2 is executed by execution host 108-2 for each TYPEA instance returned by the execution of resolver function 404-1 to resolve field FIELD4 of the TYPEA instance to a data object of type TYPEB. To resolve field FIELD4 of a TYPEA instance to an instance of type TYPEB, resolver function-2 404-2 accesses data source-2 406-2. Each returned instance of type TYPEB has field FIELD5 with a String value that does not need further resolving by a resolver function and field FIELD6 having an Integer value that also does not need further resolving by a resolver function. Thus, executing query operation 402 requires N+1 executions of a resolver function. One execution of resolver function 404-1 and N executions of resolver function-2 404-2 where N is the number of instances of TYPEA in the list provided by the execution of resolver function 404-1. A request cost index determined for query operation 402 can reflect an amount of computing resources of execution host 108-2 utilized to execute the N+1 resolver function executions.

Figure 4:
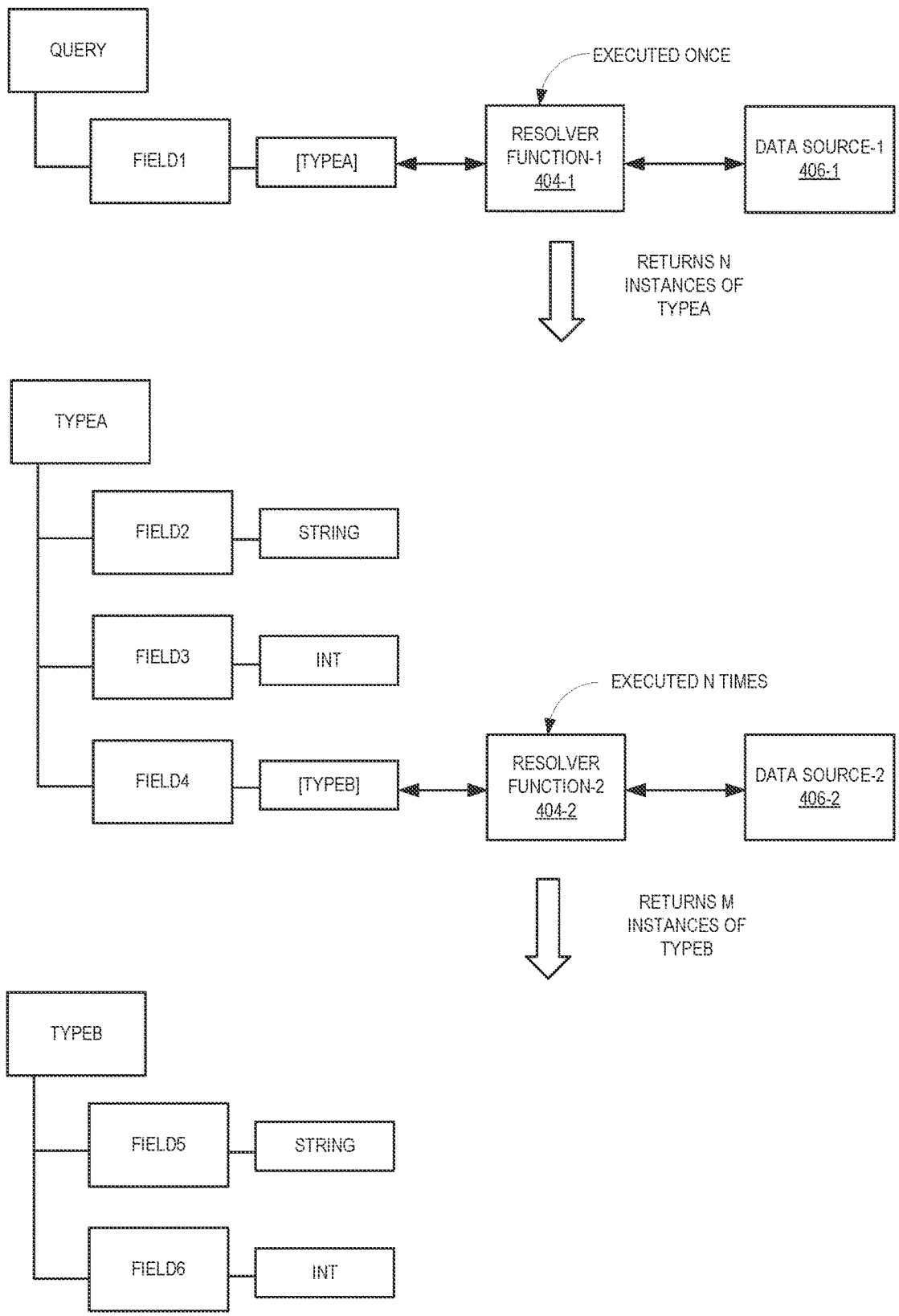
FIG. 4 illustrates an example of generative query operation execution, according to some examples.

FIG. 5 is a diagram illustrating tree representation 502 of the result to the example generative query operation of FIG. 4 according to an embodiment. As shown, the response includes N instances of type TYPEA and each TYPEA instance includes M instances of type TYPEB.

Figure 6:
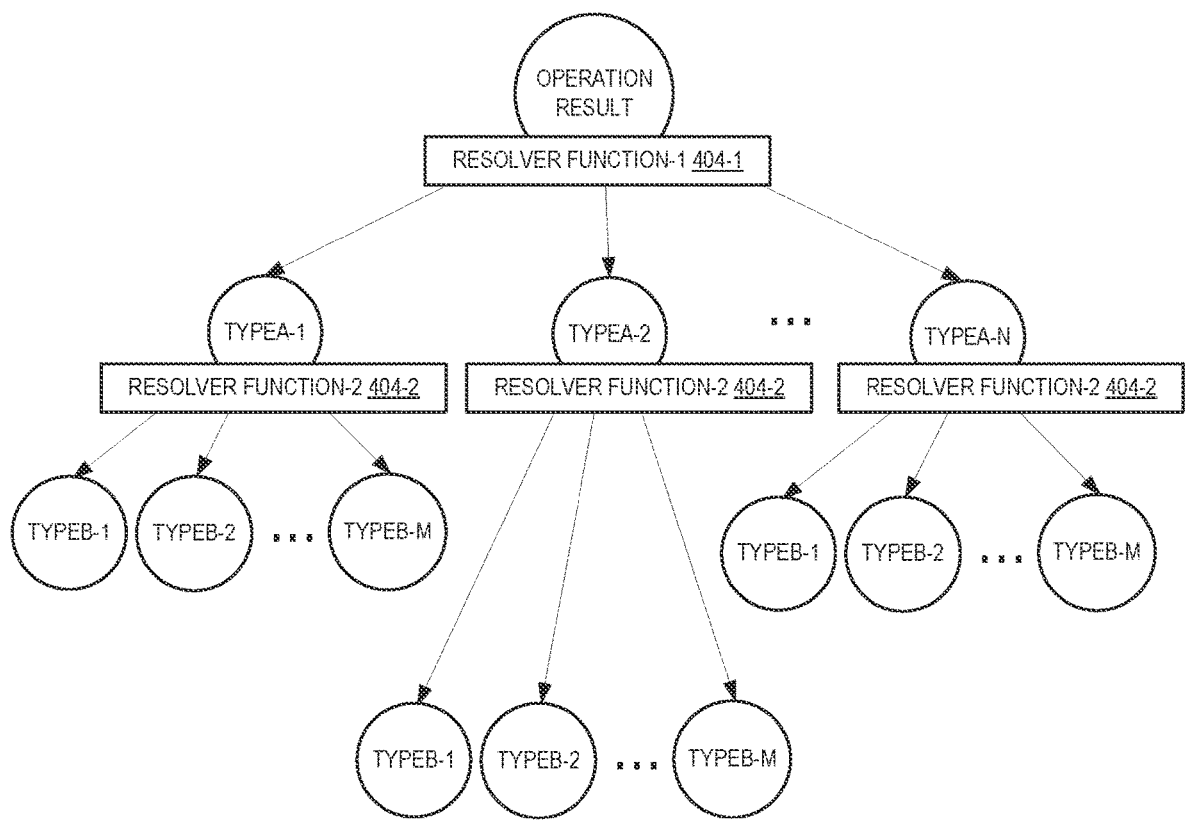
FIG. 6 illustrates a tree representation of resolver function executions involved in generating the operation result of the example generative query operation of FIG. 4, according to some examples.

FIG. 6 is a diagram illustrating tree representation 602 of resolver function executions involved in generating the result to the example query operation of FIG. 4 according to an embodiment. As shown, resolver function-1 404-1 is executed once and resolver function-2 404-2 is executed N times, once for each TYPEA instance returned by resolver function-1 404-1.

Figure 7:
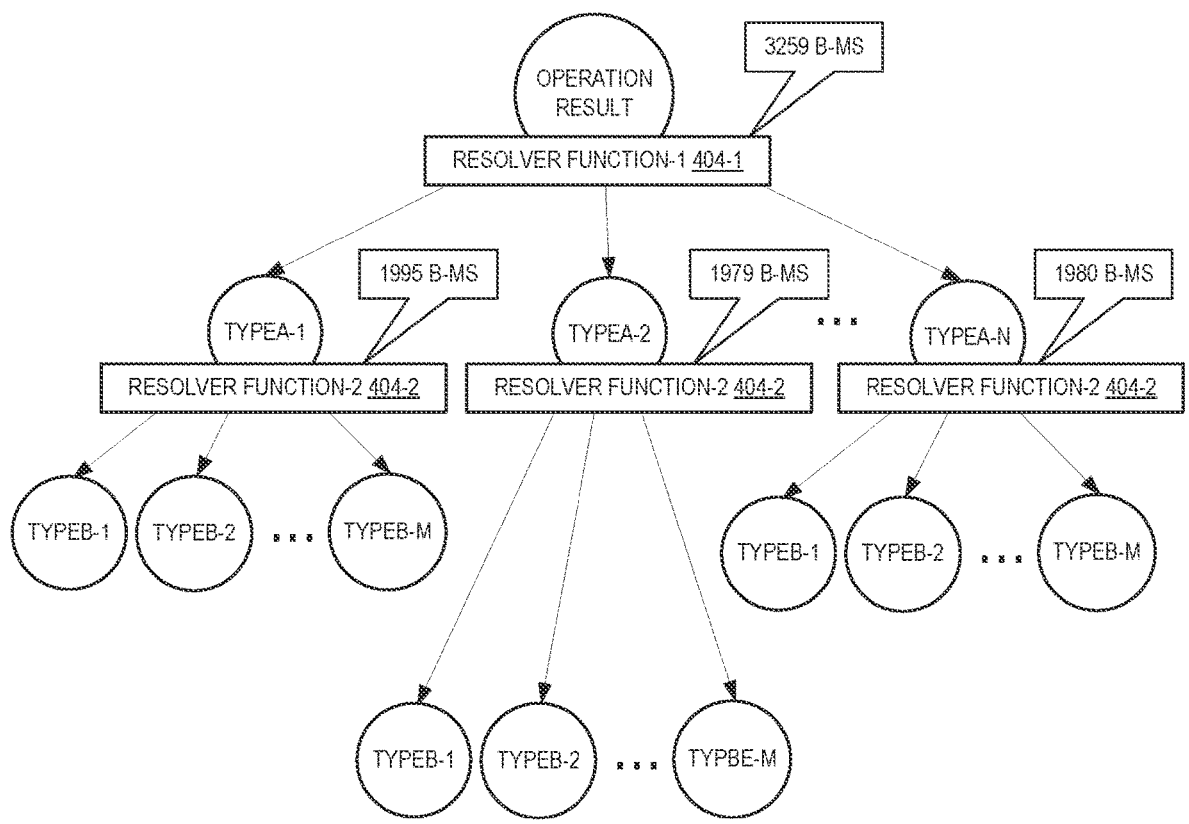
FIG. 7 illustrates a tree representation of node request cost indexes determined for the resolver function executions involved in generating the operation result to the example generative query operation of FIG. 4, according to some examples.

FIG. 7 is a diagram illustrating tree representation 702 of per-node request cost index determinations for the resolver function executions involved in generating the result to the example query operation of FIG. 4 according to an embodiment. For example, the node request cost index determined for the execution of resolver function 404-1 is 3,259 bytes-milliseconds and the node request cost index determined for the execution of resolver function-2 404-2 for the second TYPEA instance is 1,979 bytes-milliseconds. In an embodiment, the total request cost index for the query operation is determined as the sum of the node request cost indexes determined for the resolver function executions.

Figure 8:
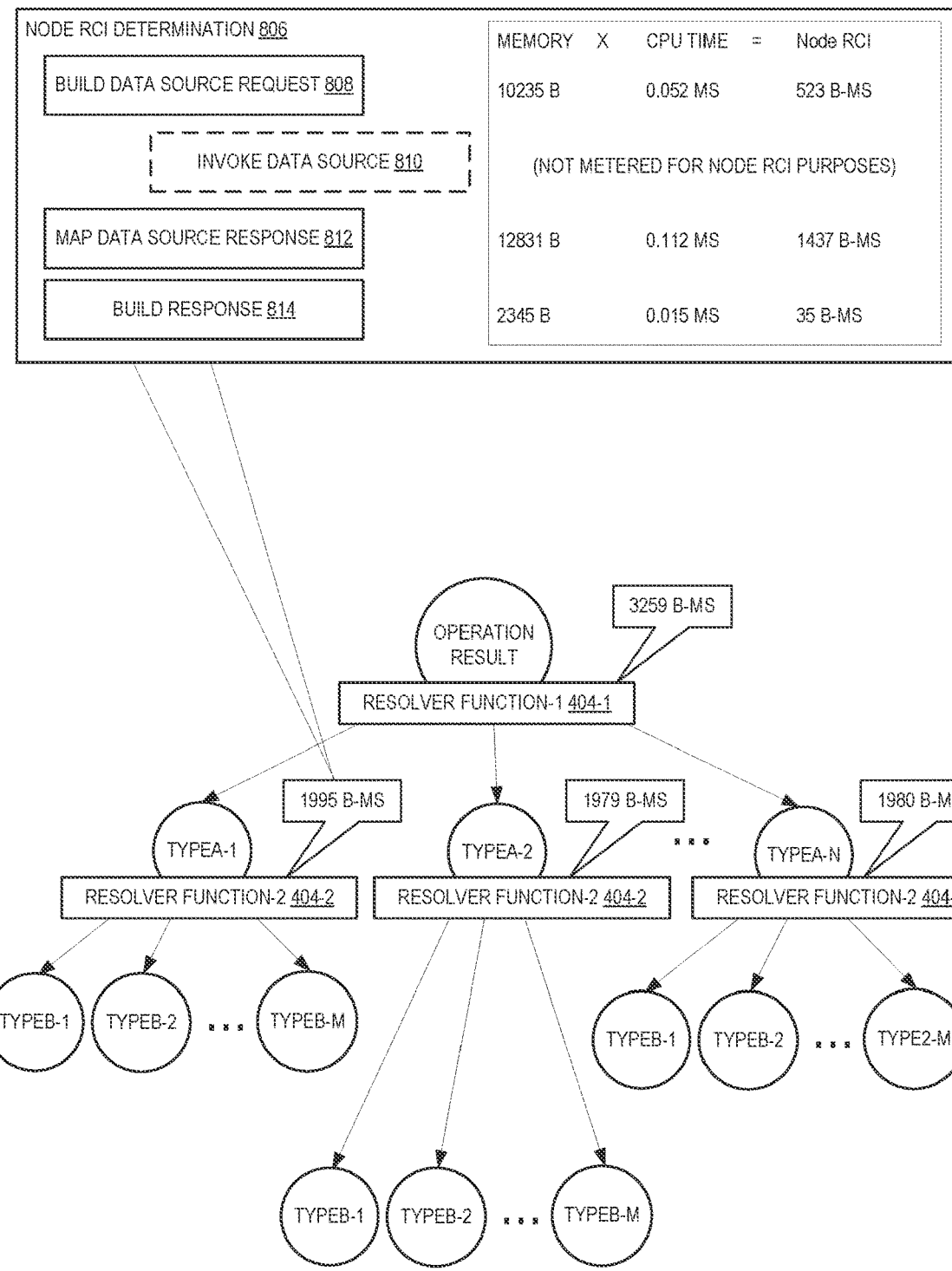
FIG. 8 illustrates an example of node request cost index determination for one resolver function execution involved in generating the operation result to the example generative query operation of FIG. 4, according to some examples.

FIG. 8 is a diagram illustrating an example of determining the node request cost index for one of the resolver function executions involved in generating the result to the example query operation of FIG. 4 according to an embodiment. Example node request cost index determination 806 involves measuring the amount of memory allocated and the processor time consumed by executing resolver function-2 404-2 for the first TYPEA instance (TYPEA-1). The instructions of resolver function-2 404-2 are programmed or configured to build data source request 808, invoke data source 810, map data source response 812, and build response 814. For example, build data source request 808 can prepare a request of a data source to fetch data for field FIELD4 of instance TYPEA-1. Preparing the request can involve serializing data objects to a data serialization format such as JSON, XML, or the like. Invoke data source 810 can send the prepared response to the data source and receive a response from the data source. Map data source response 812 can map the response received from the data source to data objects. For example, mapping the data source response can involve deserializing data fetched from the data source from a data serialization format such as JSON, XML, or the like into data objects. Build response 814 can involve formatting the deserialized data objects according to the API query language grammar for inclusion as part of the operation result. Determination 806 involves measuring the amount of memory allocated and processor time consumed executing operations 808, 812, and 814 but not operation 810 (invoke data source) which is not metered for node request cost index purposes. Invoked data source 810 might not be metered for node request cost index determination 806 because it mostly involves lower-level network I/O operations or standard API operations such as sending the request to the data source and receiving the response from the data source that are not part of the customized logic of resolver function-2 404-2 that is programmed or configured by an application developer. The total node request cost index then is determined as the sum of the request cost indexes determined for the metered operations 808, 812, and 814.

Figure 9:
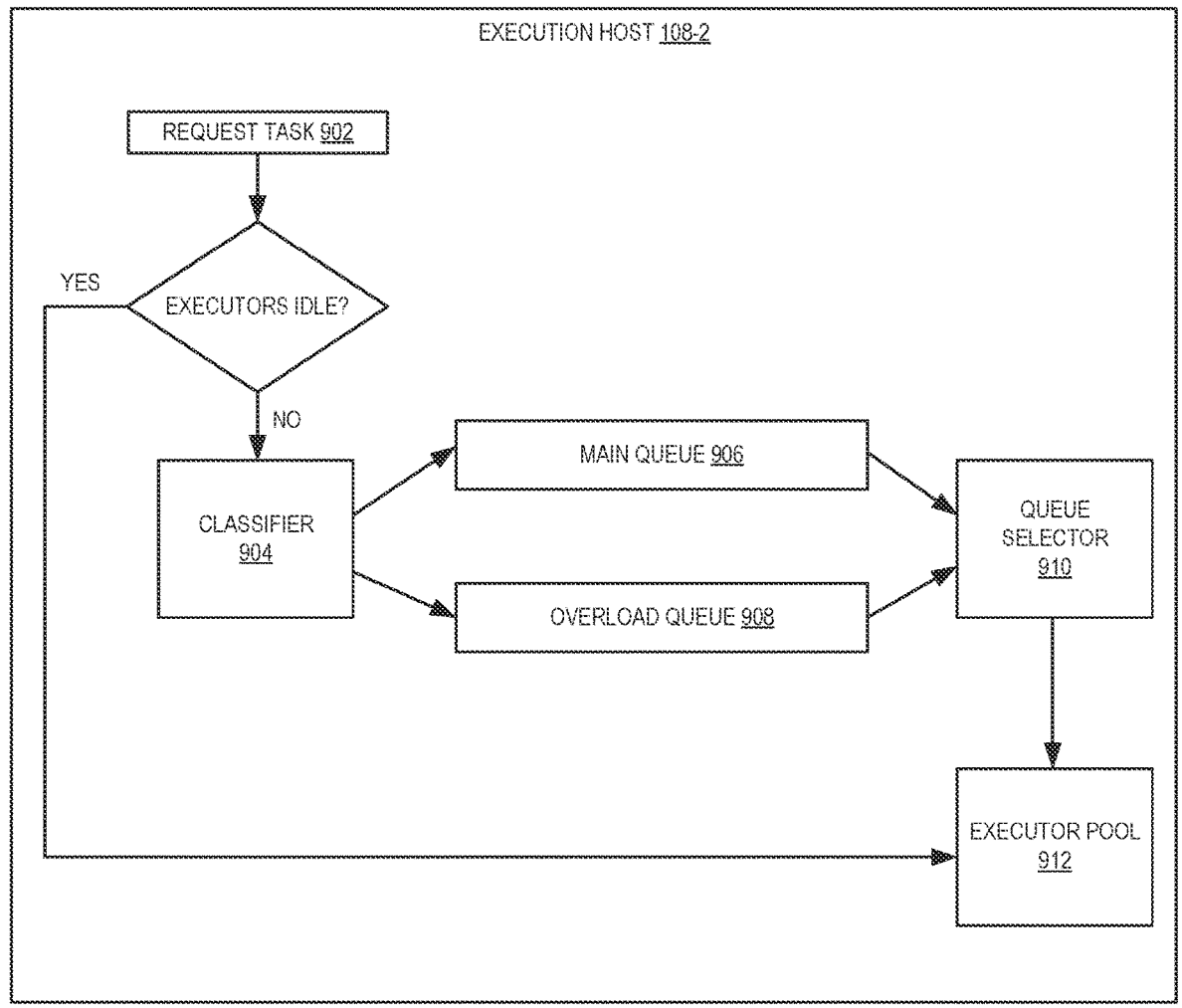
FIG. 9 illustrates detailed operation of an execution host in fair queuing of request tasks spawned by requests to execute normal and heavy generative operations, according to some examples.

FIG. 9 illustrates detailed operation of execution host 108-2 in fair queuing of request tasks spawned by requests to execute normal and heavy generative operations, according to some examples. A fair queuing goal can be to deprioritize request tasks spawned by heavy generative operations in favor of request tasks spawned by normal generative operations. While a single request task is depicted in FIG. 9, execution host 108-2 can perform the operations depicted in FIG. 9 for many request tasks, many generative operations, and many requests including doing so concurrently.

As depicted in FIG. 9, request tasks spawned by generative operations can be sent to executor pool 912 for execution either (1) through one of queues 906 or 908 or (2) "directly" bypassing queues 906 and 908. Executor pool 912 can have a number of executors. At any given time, all executors in pool 912 can be active, all executors can be idle, or some executors can be active and others idle. The number of executors allocated to pool 912 can be a user or programmatically configurable parameter selected according to the requirements of the particular implementation at hand including, for example, the number of processors of execution host 108-2 made available to executor pool 912 for executing executors.

The number of executors in pool 912 may also automatically increase and decrease between a minimum executor count and a maximum executor count. The minimum executor count represents the minimum number of executors (a floor) that should be allocated in pool 912. The maximum executor count represents the maximum number of executors (a ceiling) that should be allocated in pool 912. Both the minimum executor count and the maximum executor count can be user or programmatically configurable parameters selected according to the requirements of the particular implementation at hand including, for example, the number of processors of execution host 108-2 made available to executor pool 912 for executing executors.

Executor pool 912 can also have an internal blocking queue (not depicted). Request tasks sent to executor pool 912 for execution that are not immediately assigned to an executor can temporarily wait in the internal blocking queue until the request task reaches the head of the internal blocking queue and an executor in pool 912 is available to take on the request task. In some examples, when executor pool 912 is sent a request task to execute at execution host 108-2, if there are less than minimum executor count number of executors currently allocated in pool 912, then pool 912 can create a new executor, allocate it to the pool 912, and assign the request task to the new executor for execution. If there are at least the minimum executor count number of executors currently allocated in pool 912, then the request task can be queued in the internal blocking queue. If the internal blocking queue is at its capacity and there are less than the maximum executor count number of executors currently allocated in pool 912, then pool 912 can create a new executor, allocate it to the pool 912, and assign the request task to the new executor for execution. If the internal blocking queue is at its capacity and there are maximum executor count number of executors currently allocated in pool 912, then the request task can be rejected by pool 912. In which case, a rejection handler can decide how to handle the rejection such as by discarding the request task or running the request task in a calling executor.

The minimum executor count of pool 912 can be selected so that most request tasks are assigned to executors in pool 912 quickly and so that the request tasks do not wait long in the internal blocking queue of pool 912. However, in this case, a heavy generative operation still has the potential to dominate the computing resources of execution host 108-2 to the determinant of concurrently executing normal generative operations because pool 912 does not differentiate between request tasks spawned by the different types of operations.

To address this and other issues, main queue 906 and overload queue 908 can be used by execution host 108-2 to queue request tasks before the request tasks are sent to pool 912. When request task 902 (e.g., a resolver function) is ready to be executed, an initial determination is made whether there is currently an idle executor in executor pool 912. For example, an API of executor pool 912 can be invoked to make this initial determination. If so, then request task 902 can be sent directly to pool 912 for assignment to an idle executor, bypassing main queue 906 and overload queue 908.

On the other hand, if the initial determination is that there are currently no idle executors in pool 912, then request task 902 can be added by classifier 904 to main queue 906 or overload queue 908 depending on the current classification of the "owning" generative operation that spawned request task 902. If the owning generative operation is currently classified as normal by classifier 904, then request task 902 can be added by classifier 904 to main queue 906. If the owning generative operation is currently classified as heavy by classifier 904, then request task 902 can be added by classifier 904 to overload queue 908.

Classifier 904 can maintain a current classification for the owning generative operation and for each other generative operation that execution host 108-2 is executing concurrently with the owning generative operation. The current classification for a generative operation can be based on a current request cost index determined for the generative operation and a current request task cardinality for the generative operation. In some examples, the current classification for the generative operation is normal if both the current request cost index for the generative operation and the current request task cardinality for the generative operation are below respective thresholds. The thresholds can be empirically or automatically selected such that they correspond to a high percentile request cost index (e.g., a $90^{th}$, $95^{th}$, or $99^{th}$ percentile request cost index) or a high percentile request task cardinality (e.g., the $90^{th}$, $95^{th}$, or $99^{th}$ percentile request task cardinality) of a representative set of generative operations. The current classification for the generative operation can be heavy if either the current request cost index for the generative operation or the current request cost cardinality for the generative operation is above their respective threshold. A threshold can be selected according to the requirements of the particular implementation at hand including being selected empirically or selected automatically according to a threshold selection algorithm. In some examples, the request cost index threshold is selected as a high percentile request cost index (e.g., the $90^{th}$, $95^{th}$, $99^{th}$, or $99.9^{th}$ percentile request cost index) of a representative set of generative operations. Likewise, the request cost cardinality can be selected as a high percentile request task cardinality (e.g., the $90^{th}$, $95^{th}$, $99^{th}$, or $99.9^{th}$ percentile request cost cardinality) of a representative set of generative operations.

Initially, when execution host 108-2 receives a generative operation to be executed, the current request cost index and the current request task cardinality for the generative operation can be initialized to zero by classifier 904. Classifier 904 can increment the current request task cardinality (e.g., by one) for the generative operation when the generative operation spawns a request task to be executed. In some examples, classifier 904 increments the current request task cardinality for the generative operation for request tasks spawned by the generative operation that added to main queue 906 and does not increment the current request task cardinality for the generative operation for request tasks spawned by the generative operation that bypass main queue 906 and are assigned to an idle executor in pool 912. By doing so, the generative operation is not penalized for request tasks spawned by the generative operation when executor pool 912 is not at capacity. In some examples, however, classifier 904 can increment the current request task cardinality for the generative operation for each and every request task spawned by the generative operation whether the request task is added to main queue 906 or is able to bypass main queue 906.

A node request cost index can be determined for each request task spawned and executed by a generative operation. Determination of the node request cost index for a request task requires the request task to be executed. Classifier 904 can update the current request cost index for the generative operation based on a node request cost index determined for a request task spawned by the generative operation. In some examples, the current request cost index maintained by classifier 904 for the generative operation is a running total (sum) of the node request cost indexes determined for the request tasks spawned by the generative operation and executed so far during the execution of the generative operation.

Queue selector 910 can be programmed or configured to dequeue (poll) request tasks from main queue 906 and overload queue 908 and send the dequeues request tasks to pool 912 for execution at different ratios to achieve a fair balance between executing request tasks of normal generative operations and request tasks of heavy generative operations. For example, for every one request task dequeued from overload queue 908 and sent to pool 912 for execution, queue selector 910 can dequeue N number of request tasks from main queue 906 and send those request tasks to pool 912 for execution. For example, the ratio 1/N can be 1/10 or other suitable ratio selected according to the requirements of the particular implementation at hand. In some examples, instead of empirically selecting the ratio, the ratio is automatically selected according to a ratio selection algorithm. For example, the ratio selection algorithm may dynamically and automatically adjust the ratio based on input signals including, for example, measured request latencies of normal generative operations and heavy generative operations recently executed by execution service 106. For example, the ratio adjustment algorithm can adjust the ratio lower if the measured request latencies of heavy generative operations grow too large (by exceeding a threshold) or the ratio adjustment algorithm can adjust the ratio higher if the measured request latencies if normal generative operations grow too large (by exceeding a threshold).

In some examples, if only one of queues 906 and 908 currently has request tasks queued in it, then queue selector 910 can poll request tasks from that queue without regard to a ratio. Classifier 904 can reject a request task if the owning generative operation is currently classified as normal and main queue 906 is at capacity. Classifier 904 can also reject a request task if the owning generative operation is currently classified as heavy and overload queue 908 is at capacity (full). When classifier 904 rejects a request task, the request can be executed in a calling executor (e.g., thread) which can have the beneficial effect of slowing down the creation of additional request tasks as this behavior propagates up through to parent executors.

In some examples, more than two classes are used to classify generative operations. For example, a generative operation can be classified as extremely heavy by classifier 904 based on its current request cost index or its current request task cardinality exceeding a respective threshold that is even higher than the respective threshold used to classify the generative operation as heavy. In this case, classifier 904 may reject request tasks spawned by an extremely heavy generative operation. In some cases, all request tasks of the extremely heavy generative operation including those currently assigned to executors in pool 912 are dropped (shed) and the generative operation is no longer executed by execution host 108-2. Treating an extremely heavy generative operation this way can prevent exhaustion of the limited computing resources of execution host 108-2.

In the above example, classifier 904 can maintain two metrics per generative operation to detect two types of heavy generative operations. The request cost index metric reflects an amount of computing resources of execution host 108-2 used so far during by request tasks spawned by a generative operation. The request task cardinality reflects a number of request tasks spawned at execution host 108-2 so far by the generative operation during execution of the generative operation. The request task cardinality threshold can be exceeded by the generative operation before the request cost index threshold is exceeded by the generative operation if the generative operation spawns a relatively large number of relatively low complexity request tasks. On the other hand, the request cost index threshold can be exceeded by the generative operation before the request task cardinality threshold is exceeded if the generative operation spawns a relatively low number of relatively high complexity request tasks. Classifier 904 can maintain both a request cost index metric and a request task cardinality metric for each concurrently executing generative operation to provide early detection of both types of heavy generative operations (e.g., (1) relatively high request task cardinality with relatively low request cost index and (2) relatively high request cost index with relatively low request task cardinality).

In addition to or instead of maintaining a request cost index or a request task cardinality metric per generative operation, classifier 904 can maintain one or more other metrics per generative operation. For example, classifier 904 can maintain a network usage metric that reflects an amount of data sent or received via a network between execution host 108-2 and data sources 102 on behalf of request tasks spawned by a generative operation. This metric can be useful to detect a heavy generative operation that spawns a relative low number of request tasks and uses a relatively low amount of processor or memory resources of execution host 108-2 but sends or receives a large amount of data to or from data sources 102 via a network. The network usage can be measured in terms of a number of bytes sent or received via one or more physical or virtual network interfaces of execution host 108-2 on behalf of request tasks spawned by a generative operation. Alternatively, the network usage can be measured in terms of the number of bytes sent or received via one or more physical or virtual network interfaces of execution host 108-2 on behalf request tasks spawned by a generative operation multiplied by the processor time at execution host 108-2 spent executing the request tasks. In either case, classifier 904 can classify a generative operation as heavy if any of the current request cost index, the current request task cardinality, or the current network usage of the generative operation exceeds a respective threshold.

It is also possible for classifier 904 to determine that a generative operation is heavy based on a set of generative operations previously executed by API service 104 for the same user or customer. For example, an average request cost index, an average request task cardinality, or an average network usage (if used) of the set of previous generative operations can be determined. Then, a subsequent generative operation from the same user or customer can be classified as heavy based on any of these averages exceeding a respective threshold. In this case, all including the initial request tasks spawned by the generative operation that cannot be directly sent to executor pool 912 can be added to overloaded queue 908. By doing so, generative operations submitted by a user or customer that on average uses a large amount of computing sources of API service 104 can be throttled.

Subsequent generative operations submitted by the user or customer to API service 104 for execution can continue to be classified as heavy while the average request cost index, the average request task cardinality, or the average network usage of the set of previous generative operations in a sliding window of recent generative operations for the user or customer remains above a respective threshold. When the average request cost index, the average request task cardinality, and the average network usage (if used) of set of previous generative operations in the sliding window are all below their respective thresholds, then subsequent generative operations for the user or customer can return to being initially classified as normal.

Figure 10:
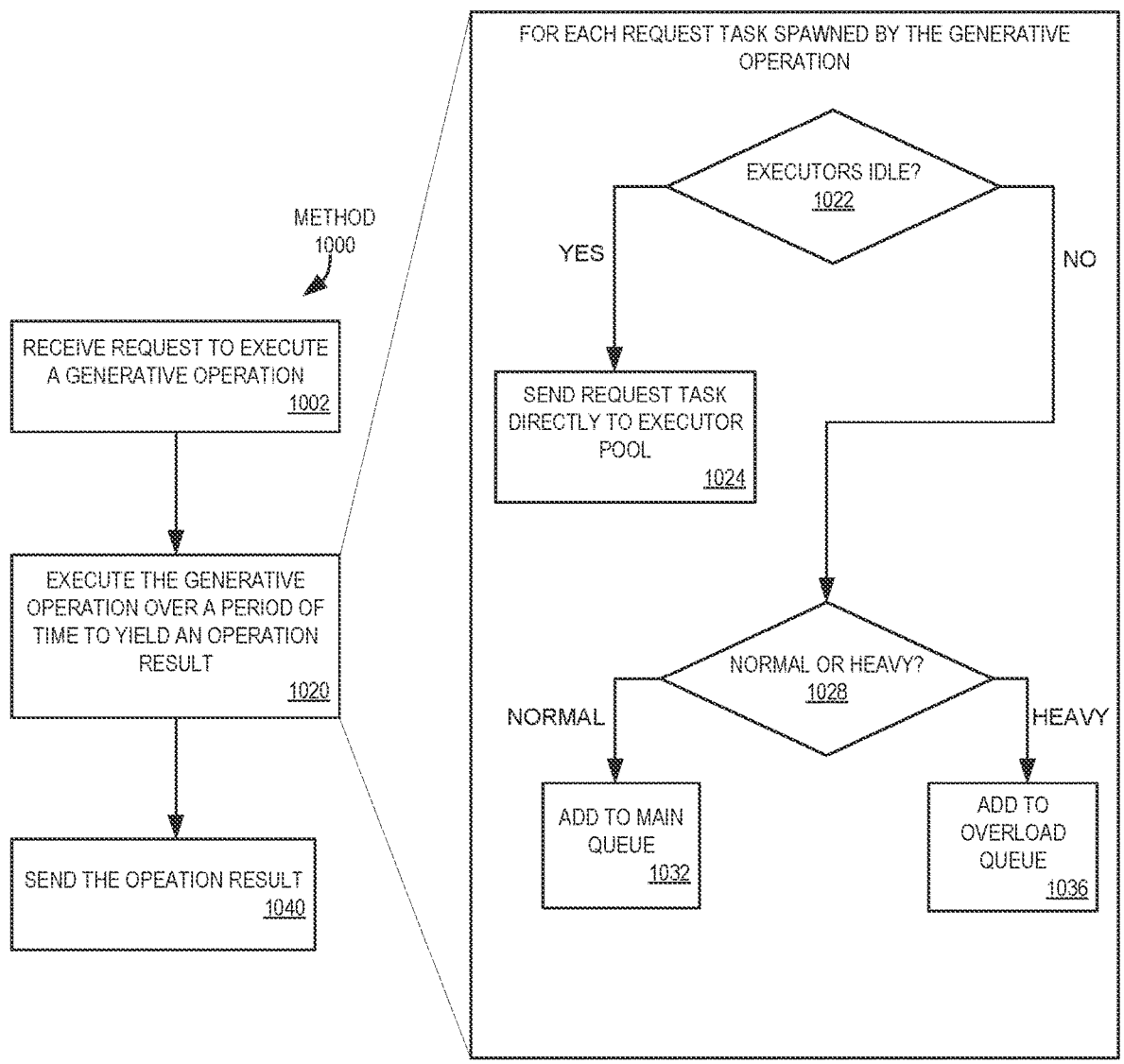
FIG. 10 is a flow diagram illustrating operations of a method for fair queuing of request tasks spawned by requests to execute normal and heavy generative operations, according to some examples.

FIG. 10 illustrates a method for fair queuing of request tasks spawned by requests to execute normal and heavy generative operations, according to some examples. The method can be performed by a host computing device in a provider network. The host computing device may include a set of one or more processors, a main queue, an overload queue, and a thread pool providing a plurality of threads.

Method 1000 begins with the host computing device receiving 1002 a request to execute a generative operation. For example, the generative operation can be a graph query language or other API query language query, mutation, or subscription that is received as part of a graph query language request or other API query language request. The request to execute the generative operation may be received via a suitable networking protocol such as HTTP or HTTPS or the like.

At step 1020, the host computing device executes the generative operation to yield an operation result. The operation result can be a graph query language or other API query language response to a graph query language or other API query language operation, for example. The host computing device executes 1020 the generative operation of a period of time during which the generative operation can spawn one or more request tasks (e.g., resolver function executions) depending on the complexity of the generative operation.

At operation 1040, the host computing device sends the operation result. For example, the operation result can be sent to a computing device from which the request to execute the generative operation was received at step 1002.

Operations 1022, 1024, 1028, 1032, or 1036 can be performed during the period of time during which the host computing device executes the generative operation for each request task spawned by the generative operation.

At operation 1022, a determination is made whether an executor pool currently has any idle executors. If the executor pool currently has idle executors, then the request task can be sent 1024 directly to the executor pool for execution, bypassing the main and overload queues. On the other hand, if the determination at operation 1022 is that the executor pool does not currently have any idle executors, then at operation 1028, a determination is made whether the generative operation is currently classified as normal or heavy. If the determination at operation 1028 is that the generative operation is currently classified as normal, then the request task is added to the main queue at operation 1032. On the other hand, if the determination at operation 1028 is that the generative operation is currently classified as heavy, then the request task is added to the overload queue at operation 1036.

Request tasks spawned by the generative operation that are added to the main queue are dequeued from the main queue and sent to the executor pool for execution. Each request task can be dequeued when it reaches the head or the front of the main queue. A request task can be dequeued from the main queue when the executor pool is ready to accept a new request task. The executor pool may not be ready to accept a new request task if all executors in the executor pool are active and the maximum number of allowed executors already exist in the executor pool such that new executors cannot be created and added to the executor pool. If the executor pool uses an internal blocking queue, then the executor pool may not be ready to accept a new request task if the internal blocking queue is full. Request tasks added to the main queue can be dequeued from the main queue and sent to the executor pool for execution. Each request task sent to the executor pool can be immediately executed by the executor pool if an idle thread is currently available, or eventually executed by the executor pool after waiting in the internal blocking queue.

Request tasks spawned by the generative operation that are added to the overload queue are dequeued from the overload queue and sent to the executor pool for execution. Each request task can be dequeued when it reaches the head or the front of the overload queue. A request task can be dequeued from the overload queue when the executor pool is ready to accept a new request task.

To provide fair execution mixed generative operation loads encompassing a mix of normal and heavy generative operations, the host computing device can dequeue and execute request tasks from the main queue at a greater frequency than request tasks are dequeued and executed from the overload queue. In some examples, for every one request task that is dequeued and executed from the overloaded queue, ten request tasks are dequeued and executed from the main queue. However, a ten to one ratio is not required, and other ratios can be used according to the requirements of the particular implementation at hand.

While in some examples two queues are used, a singe dynamic priority queue can be used. In this case, the queue can queue request tasks for a mix of normal and heavy generative operations. The priorities of request tasks added to the queue can be dynamically adjusted or determine to ensure that request tasks spawned by heavy generative operations wait in the queue for at least a predetermined amount of time whereas request tasks spawned by normal generative operations have no minimum wait time.

Figure 11:
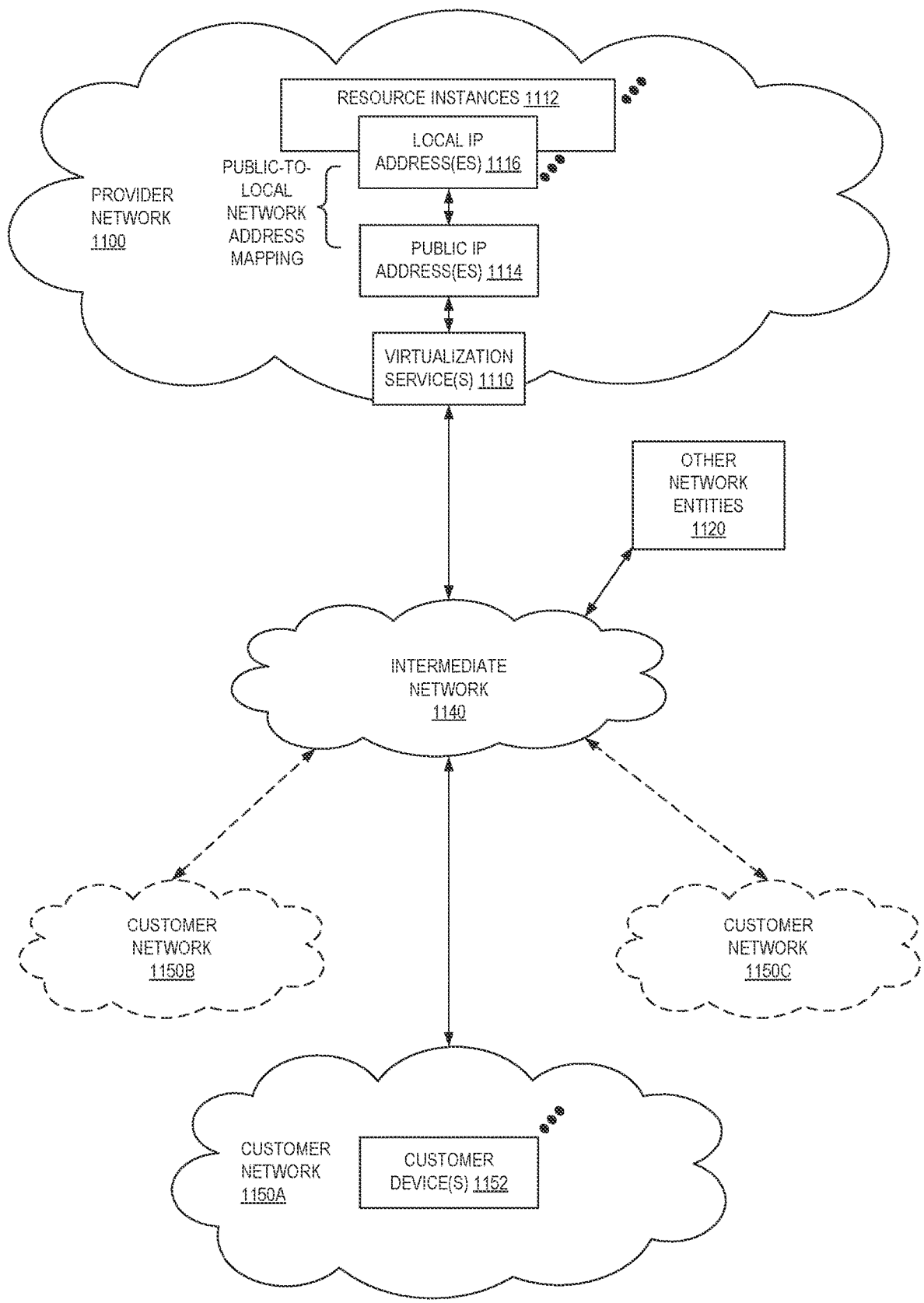
FIG. 11 illustrates an example provider network environment according to some embodiments.

FIG. 11 illustrates an example provider network (or "service provider system") environment according to some examples. A provider network 1100 can provide resource virtualization to customers via one or more virtualization services 1110 that allow customers to purchase, rent, or otherwise obtain instances 1112 of virtualized resources, including but not limited to computation and storage resources, implemented on devices within the provider network or networks in one or more data centers. Local Internet Protocol (IP) addresses 1116 can be associated with the resource instances 1112; the local IP addresses are the internal network addresses of the resource instances 1112 on the provider network 1100. In some examples, the provider network 1100 can also provide public IP addresses 1114 and/or public IP address ranges (e.g., Internet Protocol version 4 (IPv4) or Internet Protocol version 6 (IPv6) addresses) that customers can obtain from the provider 1100.

Conventionally, the provider network 1100, via the virtualization services 1110, can allow a customer of the service provider (e.g., a customer that operates one or more customer networks 1150A-1150C (or "client networks") including one or more customer device(s) 1152) to dynamically associate at least some public IP addresses 1114 assigned or allocated to the customer with particular resource instances 1112 assigned to the customer. The provider network 1100 can also allow the customer to remap a public IP address 1114, previously mapped to one virtualized computing resource instance 1112 allocated to the customer, to another virtualized computing resource instance 1112 that is also allocated to the customer. Using the virtualized computing resource instances 1112 and public IP addresses 1114 provided by the service provider, a customer of the service provider such as the operator of the customer network(s) 1150A-1150C can, for example, implement customer-specific applications and present the customer's applications on an intermediate network 1140, such as the Internet. Other network entities 1120 on the intermediate network 1140 can then generate traffic to a destination public IP address 1114 published by the customer network(s) 1150A-1150C; the traffic is routed to the service provider data center, and at the data center is routed, via a network substrate, to the local IP address 1116 of the virtualized computing resource instance 1112 currently mapped to the destination public IP address 1114. Similarly, response traffic from the virtualized computing resource instance 1112 can be routed via the network substrate back onto the intermediate network 1140 to the source entity 1120.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some examples, the mapping of a standard IP address to a local IP address of a resource instance is the default launch configuration for all resource instance types.

At least some public IP addresses can be allocated to or obtained by customers of the provider network 1100; a customer can then assign their allocated public IP addresses to particular resource instances allocated to the customer. These public IP addresses can be referred to as customer public IP addresses, or simply customer IP addresses. Instead of being assigned by the provider network 1100 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 12:
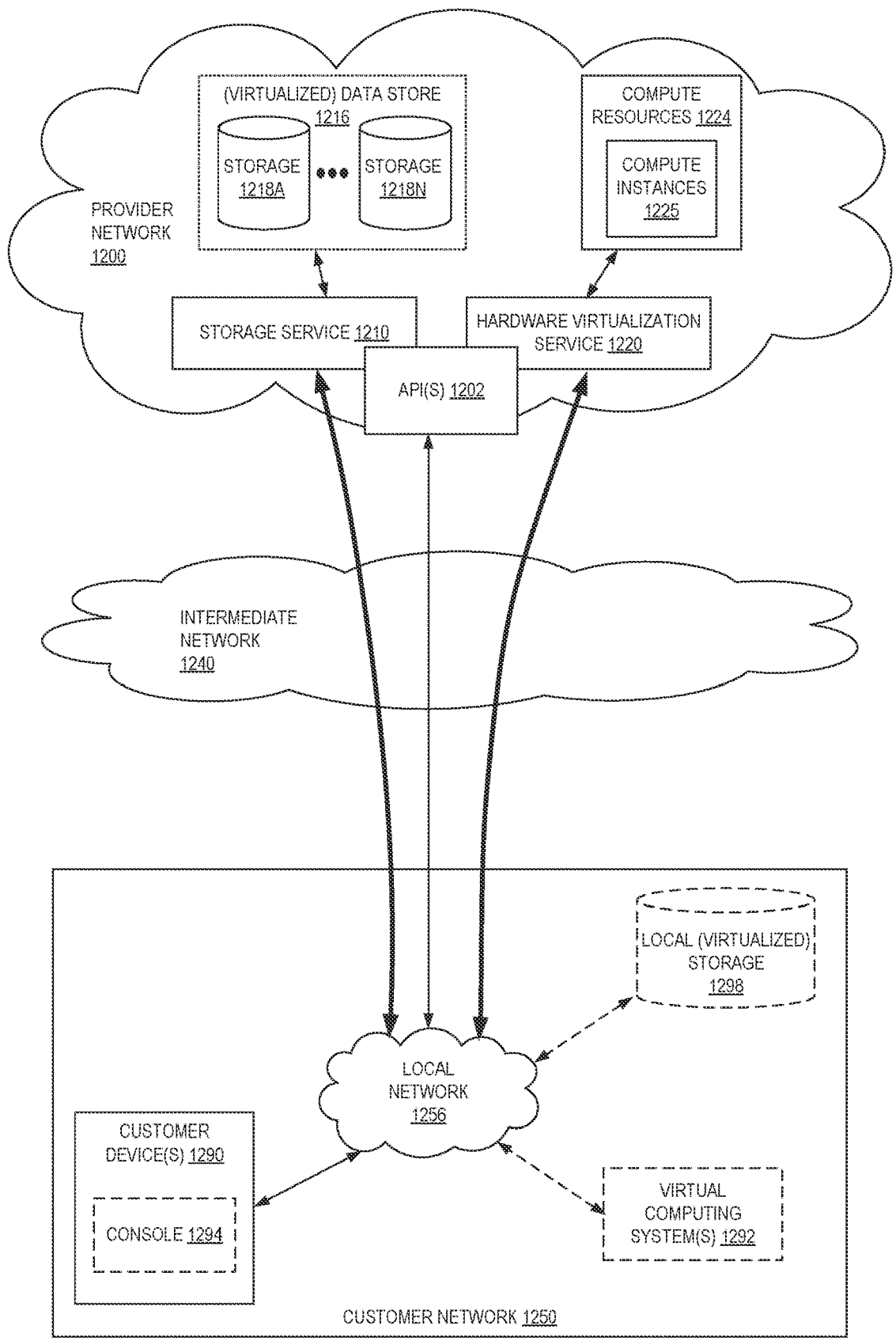
FIG. 12 is a block diagram of an example provider network that provides a storage service and a hardware virtualization service to customers according to some examples.

FIG. 12 is a block diagram of an example provider network environment that provides a storage service and a hardware virtualization service to customers, according to some examples. A hardware virtualization service 1220 provides multiple compute resources 1224 (e.g., compute instances 1225, such as VMs) to customers. The compute resources 1224 can, for example, be provided as a service to customers of a provider network 1200 (e.g., to a customer that implements a customer network 1250). Each computation resource 1224 can be provided with one or more local IP addresses. The provider network 1200 can be configured to route packets from the local IP addresses of the compute resources 1224 to public Internet destinations, and from public Internet sources to the local IP addresses of the compute resources 1224.

The provider network 1200 can provide the customer network 1250, for example coupled to an intermediate network 1240 via a local network 1256, the ability to implement virtual computing systems 1292 via the hardware virtualization service 1220 coupled to the intermediate network 1240 and to the provider network 1200. In some examples, the hardware virtualization service 1220 can provide one or more APIs 1202, for example a web services interface, via which the customer network 1250 can access functionality provided by the hardware virtualization service 1220, for example via a console 1294 (e.g., a web-based application, standalone application, mobile application, etc.) of a customer device 1290. In some examples, at the provider network 1200, each virtual computing system 1292 at the customer network 1250 can correspond to a computation resource 1224 that is leased, rented, or otherwise provided to the customer network 1250.

From an instance of the virtual computing system(s) 1292 and/or another customer device 1290 (e.g., via console 1294), the customer can access the functionality of a storage service 1210, for example via the one or more APIs 1202, to access data from and store data to storage resources 1218A-1218N of a virtual data store 1216 (e.g., a folder or "bucket," a virtualized volume, a database, etc.) provided by the provider network 1200. In some examples, a virtualized data store gateway (not shown) can be provided at the customer network 1250 that can locally cache at least some data, for example frequently accessed or critical data, and that can communicate with the storage service 1210 via one or more communications channels to upload new or modified data from a local cache so that the primary store of data (the virtualized data store 1216) is maintained. In some examples, a user, via the virtual computing system 1292 and/or another customer device 1290, can mount and access virtual data store 1216 volumes via the storage service 1210 acting as a storage virtualization service, and these volumes can appear to the user as local (virtualized) storage 1298.

While not shown in FIG. 12, the virtualization service(s) can also be accessed from resource instances within the provider network 1200 via the API(s) 1202. For example, a customer, appliance service provider, or other entity can access a virtualization service from within a respective virtual network on the provider network 1200 via the API(s) 1202 to request allocation of one or more resource instances within the virtual network or within another virtual network.

Figure 13:
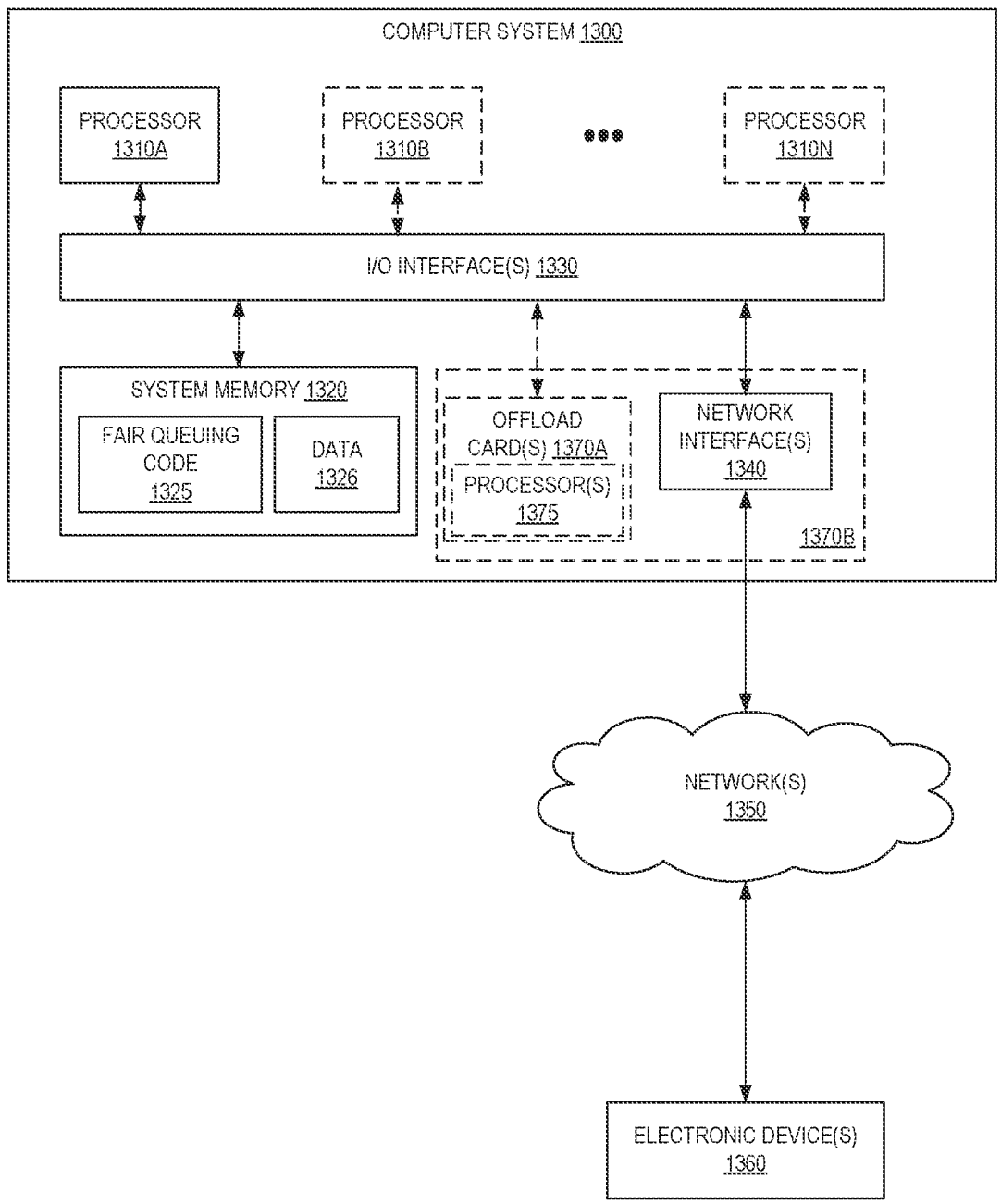
FIG. 13 is a block diagram illustrating an example computer system that can be used in some embodiments.

In some examples, a system that implements a portion or all of the techniques described herein can include a general-purpose computer system, such as the computer system 1300 illustrated in FIG. 13, that includes, or is configured to access, one or more computer-accessible media. In the illustrated example, the computer system 1300 includes one or more processors 1310 coupled to a system memory 1320 via an input/output (I/O) interface 1330. The computer system 1300 further includes a network interface 1340 coupled to the I/O interface 1330. While FIG. 13 shows the computer system 1300 as a single computing device, in various examples the computer system 1300 can include one computing device or any number of computing devices configured to work together as a single computer system 1300.

In various examples, the computer system 1300 can be a uniprocessor system including one processor 1310, or a multiprocessor system including several processors 1310 (e.g., two, four, eight, or another suitable number). The processor(s) 1310 can be any suitable processor(s) capable of executing instructions. For example, in various examples, the processor(s) 1310 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 1310 can commonly, but not necessarily, implement the same ISA.

The system memory 1320 can store instructions and data accessible by the processor(s) 1310. In various examples, the system memory 1320 can be implemented using any suitable memory technology, such as random-access memory (RAM), static RAM (SRAM), synchronous dynamic RAM (SDRAM), nonvolatile/Flash-type memory, or any other type of memory. In the illustrated example, program instructions and data implementing one or more desired functions, such as those methods, techniques, and data described above, are shown stored within the system memory 1320 as fair queuing code 1325 (e.g., executable to implement, in whole or in part, the techniques disclosed herein for fair queuing of request tasks spawned by requests of API service 104 to execute generative operations) and data 1326.

In some examples, the I/O interface 1330 can be configured to coordinate I/O traffic between the processor 1310, the system memory 1320, and any peripheral devices in the device, including the network interface 1340 and/or other peripheral interfaces (not shown). In some examples, the I/O interface 1330 can perform any necessary protocol, timing, or other data transformations to convert data signals from one component (e.g., the system memory 1320) into a format suitable for use by another component (e.g., the processor 1310). In some examples, the I/O interface 1330 can include support for devices attached through various types of peripheral buses, such as a variant of the Peripheral Component Interconnect (PCI) bus standard or the Universal Serial Bus (USB) standard, for example. In some examples, the function of the I/O interface 1330 can be split into two or more separate components, such as a north bridge and a south bridge, for example. Also, in some examples, some or all of the functionality of the I/O interface 1330, such as an interface to the system memory 1320, can be incorporated directly into the processor 1310.

The network interface 1340 can be configured to allow data to be exchanged between the computer system 1300 and other devices 1360 attached to a network or networks 1350, such as other computer systems or devices as illustrated in FIG. 1, for example. In various examples, the network interface 1340 can support communication via any suitable wired or wireless general data networks, such as types of Ethernet network, for example. Additionally, the network interface 1340 can support communication via telecommunications/telephony networks, such as analog voice networks or digital fiber communications networks, via storage area networks (SANs), such as Fibre Channel SANs, and/or via any other suitable type of network and/or protocol.

In some examples, the computer system 1300 includes one or more offload cards 1370A or 1370B (including one or more processors 1375, and possibly including the one or more network interfaces 1340) that are connected using the I/O interface 1330 (e.g., a bus implementing a version of the Peripheral Component Interconnect-Express (PCI-E) standard, or another interconnect such as a QuickPath interconnect (QPI) or UltraPath interconnect (UPI)). For example, in some examples the computer system 1300 can act as a host electronic device (e.g., operating as part of a hardware virtualization service) that hosts compute resources such as compute instances, and the one or more offload cards 1370A or 1370B execute a virtualization manager that can manage compute instances that execute on the host electronic device. As an example, in some examples the offload card(s) 1370A or 1370B can perform compute instance management operations, such as pausing and/or un-pausing compute instances, launching and/or terminating compute instances, performing memory transfer/copying operations, etc. These management operations can, in some examples, be performed by the offload card(s) 1370A or 1370B in coordination with a hypervisor (e.g., upon a request from a hypervisor) that is executed by the other processors 1310A-1310N of the computer system 1300. However, in some examples the virtualization manager implemented by the offload card(s) 1370A or 1370B can accommodate requests from other entities (e.g., from compute instances themselves), and can not coordinate with (or service) any separate hypervisor.

In some examples, the system memory 1320 can be one example of a computer-accessible medium configured to store program instructions and data as described above. However, in other examples, program instructions and/or data can be received, sent, or stored upon different types of computer-accessible media. Generally speaking, a computer-accessible medium can include any non-transitory storage media or memory media such as magnetic or optical media, e.g., disk or DVD/CD coupled to the computer system 1300 via the I/O interface 1330. A non-transitory computer-accessible storage medium can also include any volatile or non-volatile media such as RAM (e.g., SDRAM, double data rate (DDR) SDRAM, SRAM, etc.), read only memory (ROM), etc., that can be included in some examples of the computer system 1300 as the system memory 1320 or another type of memory. Further, a computer-accessible medium can include transmission media or signals such as electrical, electromagnetic, or digital signals, conveyed via a communication medium such as a network and/or a wireless link, such as can be implemented via the network interface 1340.

Various examples discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most examples use at least one network that would be familiar to those skilled in the art for supporting communications using any of a variety of widely available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In examples using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C# or C++, or any scripting language, such as Perl, Python, PHP, or TCL, as well as combinations thereof. The server(s) can also include database servers, including without limitation those commercially available from Oracle®, Microsoft®, Sybase®, IBM®, etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of examples, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate examples can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various examples.

Unless the context clearly indicates otherwise, the term "or" is used in the foregoing specification and in the appended claims in its inclusive sense (and not in its exclusive sense) so that when used, for example, to connect a list of elements, features, acts, or operations, the term "or" means one, some, or all the elements, features, acts, or operations in the list.

Unless the context clearly indicates otherwise, the terms "comprising," "including," "having," "based on," "encompassing," and other like terms, are used in the foregoing specification and in the appended claims in an open-ended fashion, and do not exclude additional elements, features, acts, or operations.

Unless the context clearly indicates otherwise, conjunctive language such as the phrase "at least one of X, Y, and Z," is to be understood to convey that an item, term, etc. can be either X, Y, or Z, or a combination thereof. Thus, such conjunctive language is not intended to require by default implication that at least one of X, at least one of Y, and at least one of Z to each be present.

Unless the context clearly indicates otherwise, as used in the foregoing detailed description and in the appended claims, the singular forms "a," "an," and "the" are intended to include the plural forms as well.

Unless the context clearly indicates otherwise, in the foregoing detailed description and in the appended claims, although the terms first, second, etc. are, in some instances, used herein to describe various elements, features, acts, or operations, these features, acts, or operations should not be limited by these terms. These terms are only used to distinguish one element, feature, act, or operation from another. For example, a first computing device could be termed a second computing device, and, similarly, a second computing device could be termed a first computing device. The first computing device and the second computing device are both computing devices, but they are not the same computing device.

What is claimed is:

1. A method comprising:
   receiving a graph query language request specifying a graph query language operation to be executed;
   executing the graph query language operation over a time period to yield an operation result; and
   sending the operation result;
   during the time period, dequeuing, from a main queue, and executing each request task of a first set of request tasks spawned by executing the graph query language operation;
   during the time period, determining a request cost index reflecting an amount of computing resources used to execute the first set of request tasks;
   during the time period, determining a cardinality of the first set of request tasks spawned by executing the graph query language operation;
   during the time period, determining, based on the request cost index or the cardinality, to queue, in an overload queue, subsequent request tasks spawned by executing the graph query language operation;

during the time period, queuing, in the overload queue, a second set of request tasks spawned by executing the graph query language operation; and during the time period, dequeuing, from the second queue, and executing each request task of the second set of request tasks.

2. The method of claim 1, further comprising:

during the time period, sending a request task spawned by executing the graph query language operation directly to a thread pool, bypassing the main queue and the overload queue, based on determining there is an idle thread in the thread pool.

3. The method of claim 1, further comprising:

classifying the graph query language operation as normal or heavy based on the request cost index or the cardinality exceeding a respective threshold.

4. A method comprising:

receiving a request to execute a generative operation;

executing the generative operation over a time period to yield an operation result;

sending the operation result;

during the time period, dequeuing, from a first queue, and executing each request task of a first set of request tasks spawned by executing the generative operation;

during the time period, determining a request cost index reflecting an amount of computing resources used to execute the first set of request tasks;

during the time period, determining, based on the request cost index, to queue, in a second queue, subsequent request tasks spawned by executing the generative operation;

during the time period, queuing, in the second queue, a second set of request tasks spawned by executing the generative operation; and during the time period, dequeuing, from the second queue, and executing each request task of the second set of request tasks.

5. The method of claim 4, further comprising:

during the time period, sending a request task spawned by executing the generative operation directly to a thread pool, bypassing the first queue and the second queue, based on determining there is an idle thread in the thread pool.

6. The method of claim 4, further comprising:

classifying, during the period of time, the generative operation as normal or heavy based on the request cost index exceeding a threshold.

7. The method of claim 4, wherein:

the first set of request tasks are dequeued, from the first queue, and executed at a first rate;

the second set of request tasks are dequeued, from the second queue, and executed at a second rate; and the first rate is higher than the second rate.

8. The method of claim 4, further comprising:

determining, during the period of time, a set of node request cost indexes for the first set of request tasks; and determining, during the period of time, the request cost index based on a sum of the set of node request cost indexes.

9. The method of claim 4, further comprising:

determining an average request cost index of a plurality of generative operations requested by a same user or customer as a user or customer that requested the generative operation;

during the period of time, initially classifying the generative operation as normal based on determining that the average request cost index is below a threshold; and during the period of time, queueing the first set of request tasks in the first queue based on initially classifying the generative operation as normal.

10. The method of claim 4, further comprising:

rejecting, during the period of time, a request task for execution spawned by executing the generative operation based on determining that the second queue is full; and executing, during the period of time, the rejected request task in a calling thread.

11. The method of claim 4, where the computing resources reflected by the request cost index comprise processor and memory resources of a host that executes the generative operation.

12. The method of claim 4, wherein a host concurrently executes the generative operation with a plurality of other generative operations.

13. The method of claim 4, further comprising:

determining, during the period of time, an amount of memory of a host allocated for the first set of request tasks; and determining, during the period of time, the request cost index based on the amount of memory allocated.

14. The method of claim 4, further comprising:

determining, during the period of time, an amount of processor time at host spent executing the first set of request tasks; and determining, during the period of time, the request cost index based on the amount of processor time spent.

15. A host computing device in a provider network, the host computing device comprising:

a set of one or more processors;

a main queue;

an overload queue;

a thread pool comprising a plurality of threads; and a set of instructions which when executed cause the host to:

receive a request to execute a generative operation from another host computing device in the provider network;

execute the generative operation over a time period to yield an operation result;

send the operation result to the other host computing device in the provider network;

dequeue, during the period of time, each request task of a first set of request tasks spawned by executing the generative operation from the main queue;

send, during the period of time, each request task of the first set of request tasks to the thread pool for execution;

determine, during the period of time, a request cost index reflecting an amount of computing resources used to execute the first set of request tasks;

determine, during the period of time, based on the request cost index, to queue, in the overload queue, subsequent request tasks spawned by executing the generative operation;

queue, during the period of time, a second set of request tasks spawned by executing the generative operation in the overload queue; and dequeue, during the period of time, each request task of the second set of request tasks from the overload queue; and send, during the period of time, each request task of the second set of request tasks to the thread pool for execution.

16. The system of claim 15, wherein the set of instructions when executed further cause the host to:
- send, during the period of time, based on determining there is an idle thread in the thread pool, a request task spawned by executing the generative operation directly to the thread pool, bypassing the main queue and the overload queue.

17. The system of claim 15, wherein the set of instructions when executed further cause the host to:
- classify, during the period of time, the generative operation as normal or heavy based on the request cost index exceeding a threshold.

18. The system of claim 15, wherein the set of instructions when executed further cause the host to:
- dequeue, during the period of time, the first set of request tasks and send, during the period of time, the first set of request tasks to the thread pool at a first rate; and
- dequeue, during the period of time, the second set of request tasks and send, during the period of time, the second set of request tasks to the thread pool at a second rate that is lower than the first rate.

19. The system of claim 15, wherein the set of instructions when executed further cause the host to:
- determine, during the period of time, a set of node request cost indexes for the first set of request tasks; and
- determine, during the period of time, the request cost index based on a sum of the set of node request cost indexes.

20. The system of claim 15, wherein the set of instructions when executed further cause the host to:
- determine, during the period of time, a set of node request cost indexes for the first set of request tasks; and
- determine, during the period of time, the request cost index based on an average of the set of node request cost indexes.

* * * * *